US012634734B2

(12) United States Patent
Muruganathan et al.

(10) Patent No.: US 12,634,734 B2
(45) Date of Patent: May 19, 2026

(54) ULTRA-LOW LATENCY CSI TIMELINE FOR URLLC CSI REPORTING

(71) Applicant: Telefonaktiebolaget LM Ericsson (publ), Stockholm (SE)

(72) Inventors: Siva Muruganathan, Stittsville (CA); Yufei Blankenship, Kildeer, IL (US); Shiwei Gao, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 536 days.

(21) Appl. No.: 18/006,748

(22) PCT Filed: Jul. 29, 2021

(86) PCT No.: PCT/IB2021/056937
§ 371 (c)(1),
(2) Date: Jan. 25, 2023

(87) PCT Pub. No.: WO2022/024041
PCT Pub. Date: Feb. 3, 2022

(65) Prior Publication Data
US 2023/0269612 A1 Aug. 24, 2023

Related U.S. Application Data

(60) Provisional application No. 63/058,440, filed on Jul. 29, 2020.

(51) Int. Cl.
*H04W 8/24* (2009.01)
*H04W 24/08* (2009.01)
(Continued)

(52) U.S. Cl.
CPC ............. *H04W 24/10* (2013.01); *H04W 8/24* (2013.01); *H04W 8/245* (2013.01); *H04W 24/08* (2013.01);
(Continued)

(58) Field of Classification Search
CPC ..... H04B 17/0082–3913; H04L 1/0023–0032; H04L 5/0048–0057;
(Continued)

(56) References Cited

U.S. PATENT DOCUMENTS

2023/0057169 A1* 2/2023 Li ........................ H04W 24/10
2023/0065668 A1* 3/2023 Manolakos ........... H04W 24/10

FOREIGN PATENT DOCUMENTS

WO 2019213941 A1 11/2019

OTHER PUBLICATIONS

Author Unknown, "Technical Specification Group Radio Access Network; NR; Multiplexing and channel coding (Release 16)," Technical Specification 38.212, Version 16.2.0, Jun. 2020, 3GPP Organizational Partners, 151 pages.
(Continued)

*Primary Examiner* — Timothy J Weidner
(74) *Attorney, Agent, or Firm* — Sonoda & Kobayashi Intellectual Property Law; Sarvajit S. Patil.

(57) ABSTRACT

Systems and methods described herein provide Channel State Information (CSI) computation with ultra-low latency, enabling such CSI computation to be used for more Ultra-Reliable Low-Latency Communication (URLLC) use cases. The solutions proposed herein can apply the ultra-low latency timing requirement to the following URLLC scenarios: CSI computation for URLLC schemes that involve multiple Transmission/Reception Point (TRP) transmissions; CSI computation for URLLC while at least one CPU is occupied for another CSI computation (i.e., when L>0); and CSI computation for URLLC with more than 4 CSI-RS ports used for channel measurements. As a result, the solutions proposed reduce the CSI reporting latency which helps in improving the reliability of URLLC Downlink (DL) transmissions.

17 Claims, 17 Drawing Sheets

DETERMINE ONE OR MORE CONDITIONS TO APPLY A LOWER CSI COMPUTATION DELAY REQUIREMENT OVER A HIGHER CSI COMPUTATION DELAY REQUIREMENT WHEN COMPUTING CSI FOR A CSI REPORT ACCORDING TO ONE OR MORE HIGHER LAYER CONFIGURED PARAMETERS
1500

PROVIDE THE CSI REPORT TO THE NETWORK USING THE LOWER CSI COMPUTATION DELAY REQUIREMENT WHEN AT LEAST ONE OF THE ONE OR MORE CONDITIONS IS MET
1502

(51) Int. Cl.

| | |
|---|---|
| *H04W 24/10* | (2009.01) |
| *H04W 72/231* | (2023.01) |
| *H04W 72/512* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ....... *H04W 72/231* (2023.01); *H04W 72/512* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ..... H04W 8/22–245; H04W 24/02–10; H04W 28/02–26; H04W 36/0005–385; H04W 72/02–569; H04W 84/02–16; H04W 88/02–12; H04W 92/02–04; H04W 92/10
See application file for complete search history.

(56) References Cited

OTHER PUBLICATIONS

Author Unknown, "Technical Specification Group Radio Access Network; NR; Physical layer procedures for data (Release 16)," Technical Specification 38.214, Version 16.2.0, Jun. 2020, 3GPP Organizational Partners, 163 pages.

Author Unknown, "Technical Specification Group Radio Access Network; NR; Radio Resource Control (RRC) protocol specification (Release 16)," Technical Specification 38.331, Version 16.1.0, Jul. 2020, 3GPP Organizational Partners, 906 pages.

Ericsson, "R1-1807648: Summary of views on CSI reporting v2," 3GPP TSG-RAN WG1 Meeting #93, May 21-25, 2018, Busan, South Korea, 18 pages.

Kaikkonen, et al., "Main Radio Interface Related System Procedures," 5G New Radio: A Beam-based Air Interface, First Edition, Apr. 2020, John Wiley & Sons Ltd., 136 pages.

Qualcomm Incorporated, "R1-1809422: Maintenance for CSI Measurement," 3GPP TSG RAN WG1 Meeting #94, Aug. 20-24, 2018, Gothenburg, Sweden, 9 pages.

International Search Report and Written Opinion for International Patent Application No. PCT/IB2021/056937, mailed Oct. 29, 2021, 15 pages.

* cited by examiner

Figure 2:
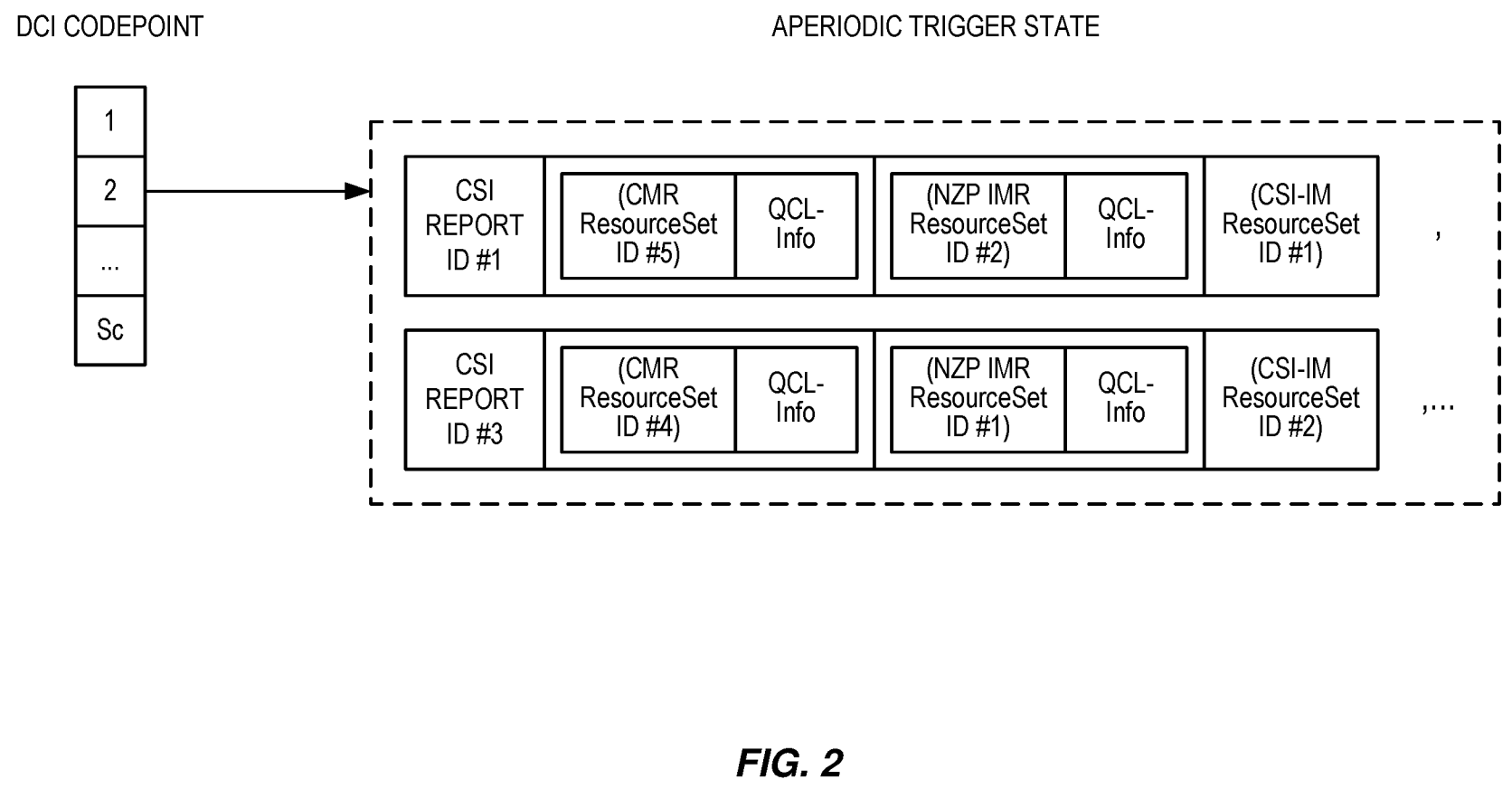

APERIODIC TRIGGER STATE

CSI REPORT ID #1 | (CMR ResourceSet ID #5) | QCL-Info | (NZP IMR ResourceSet ID #2) | QCL-Info | (CSI-IM ResourceSet ID #1)

CSI REPORT ID #3 | (CMR ResourceSet ID #4) | QCL-Info | (NZP IMR ResourceSet ID #1) | QCL-Info | (CSI-IM ResourceSet ID #2)

DCI CODEPOINT

CSI-AperiodicTriggerStateList Information Element

```
-- ASN1START
-- TAG-CSI-APERIODICTRIGGERSTATELIST-START

CSI-AperiodicTriggerStateList ::=    SEQUENCE (SIZE (1..maxNrOfCSI-AperiodicTriggers)) OF CSI-AperiodicTriggerState CSI-AperiodicTriggerState ::=    SEQUENCE {
    associatedReportConfigInfoList    SEQUENCE (SIZE(1..maxNrofReportConfigPerAperiodicTrigger)) OF CSI-AssociatedReportConfigInfo,
    ...
}

CSI-AssociatedReportConfigInfo ::=    SEQUENCE {
    reportConfigId    CSI-ReportConfigId,
    applyCsiComputationDelayRequirement1    BOOLEAN    OPTIONAL,
    resourcesForChannel    CHOICE {
        nzp-CSI-RS    SEQUENCE {
            resourceSet    INTEGER (1..maxNrofNZP-CSI-RS-ResourceSetsPerConfig),
            qcl-info    SEQUENCE (SIZE(1..maxNrofAP-CSI-RS-ResourcesPerSet)) OF TCI-StateId
                OPTIONAL    -- Cond Aperiodic
        },
        csi-SSB-ResourceSet    INTEGER (1..maxNrofCSI-SSB-ResourceSetsPerConfig)
    },
    csi-IM-ResourcesForInterference    INTEGER(1..maxNrofCSI-IM-ResourceSetsPerConfig)
        OPTIONAL,    -- Cond CSI-IM-ForInterference
    nzp-CSI-RS-ResourcesForInterference INTEGER (1..maxNrofNZP-CSI-RS-ResourceSetsPerConfig)
        OPTIONAL,    -- Cond NZP-CSI-RS-ForInterference
    ...
}

-- TAG-CSI-APERIODICTRIGGERSTATELIST-STOP
-- ASN1STOP
```

FIG. 11

```
CSI-ReportFramework ::=                                      SEQUENCE {
    maxNumberPeriodicCSI-PerBWP-ForCSI-Report                INTEGER (1..4),
    maxNumberAperiodicCSI-PerBWP-ForCSI-Report               INTEGER (1..4),
    maxNumberSemiPersistentCSI-PerBWP-ForCSI-Report          INTEGER (0..4),
    maxNumberPeriodicCSI-PerBWP-ForBeamReport                INTEGER (1..4),
    maxNumberAperiodicCSI-PerBWP-ForBeamReport               INTEGER (1..4),
    maxNumberAperiodicCSI-triggeringStatePerCC               ENUMERATED {n3, n7, n15, n31, n63, n128},
    maxNumberSemiPersistentCSI-PerBWP-ForBeamReport          INTEGER (0..4),
    simultaneousCSI-ReportsPerCC                             INTEGER (1..8)
    simultanousUltraLowLatencyCSI-ReportsPerCC               INTEGER (1..X)
}
```

*FIG. 12*

```
CSI-ReportFramework  ::=                                        SEQUENCE {
    maxNumberPeriodicCSI-PerBWP-ForCSI-Report                   INTEGER (1..4),
    maxNumberAperiodicCSI-PerBWP-ForCSI-Report                  INTEGER (1..4),
    maxNumberSemiPersistentCSI-PerBWP-ForCSI-Report             INTEGER (0..4),
    maxNumberPeriodicCSI-PerBWP-ForBeamReport                   INTEGER (1..4),
    maxNumberAperiodicCSI-PerBWP-ForBeamReport                  INTEGER (1..4),
    maxNumberAperiodicCSI-triggeringStatePerCC                  ENUMERATED {n3, n7, n15, n31, n63, n128},
    maxNumberSemiPersistentCSI-PerBWP-ForBeamReport             INTEGER (0..4),
    simultaneousCSI-ReportsPerCC                                INTEGER (1..X)
}
```

*FIG. 13*

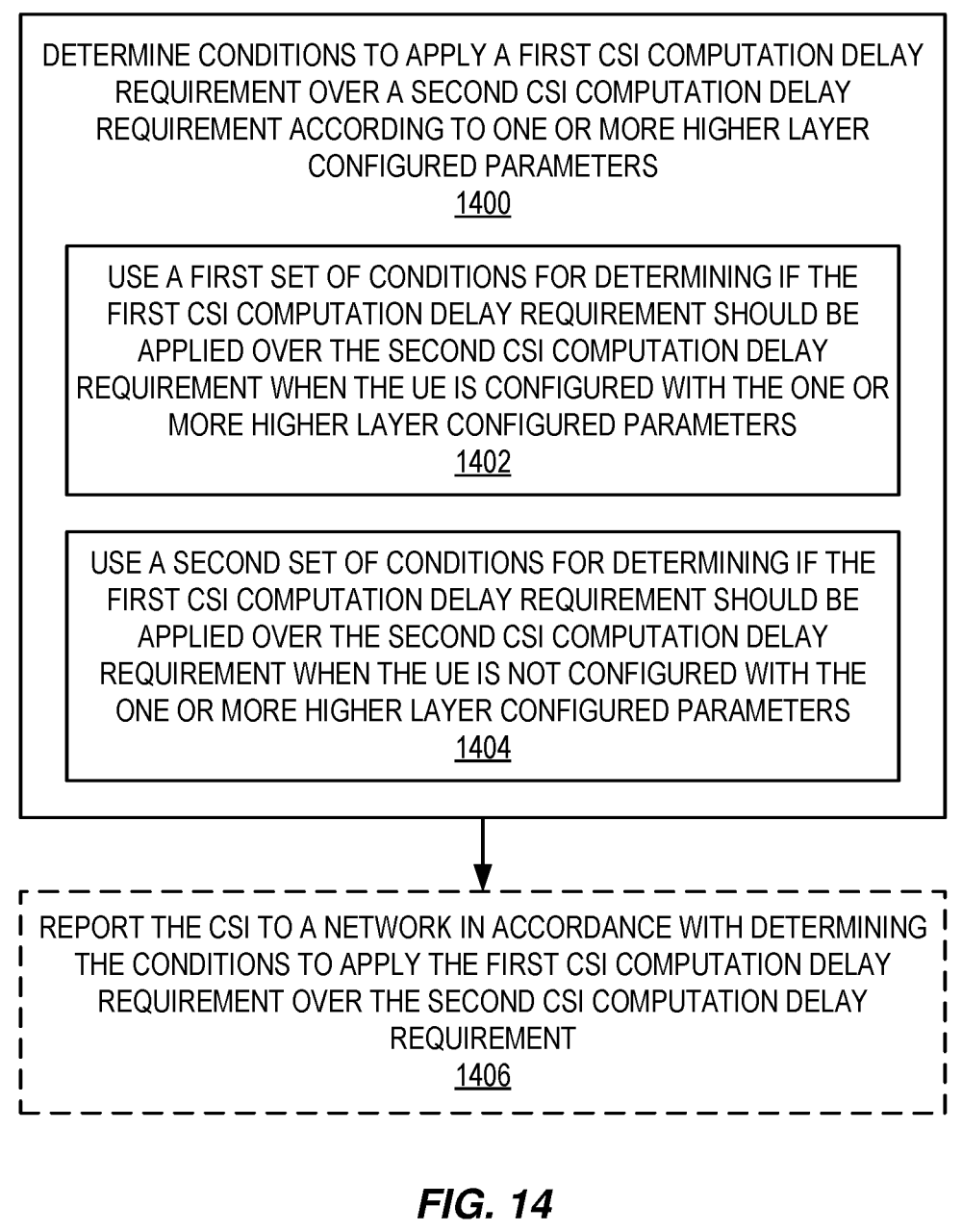

DETERMINE CONDITIONS TO APPLY A FIRST CSI COMPUTATION DELAY REQUIREMENT OVER A SECOND CSI COMPUTATION DELAY REQUIREMENT ACCORDING TO ONE OR MORE HIGHER LAYER CONFIGURED PARAMETERS
1400

USE A FIRST SET OF CONDITIONS FOR DETERMINING IF THE FIRST CSI COMPUTATION DELAY REQUIREMENT SHOULD BE APPLIED OVER THE SECOND CSI COMPUTATION DELAY REQUIREMENT WHEN THE UE IS CONFIGURED WITH THE ONE OR MORE HIGHER LAYER CONFIGURED PARAMETERS
1402

USE A SECOND SET OF CONDITIONS FOR DETERMINING IF THE FIRST CSI COMPUTATION DELAY REQUIREMENT SHOULD BE APPLIED OVER THE SECOND CSI COMPUTATION DELAY REQUIREMENT WHEN THE UE IS NOT CONFIGURED WITH THE ONE OR MORE HIGHER LAYER CONFIGURED PARAMETERS
1404

REPORT THE CSI TO A NETWORK IN ACCORDANCE WITH DETERMINING THE CONDITIONS TO APPLY THE FIRST CSI COMPUTATION DELAY REQUIREMENT OVER THE SECOND CSI COMPUTATION DELAY REQUIREMENT
1406

*FIG. 14*

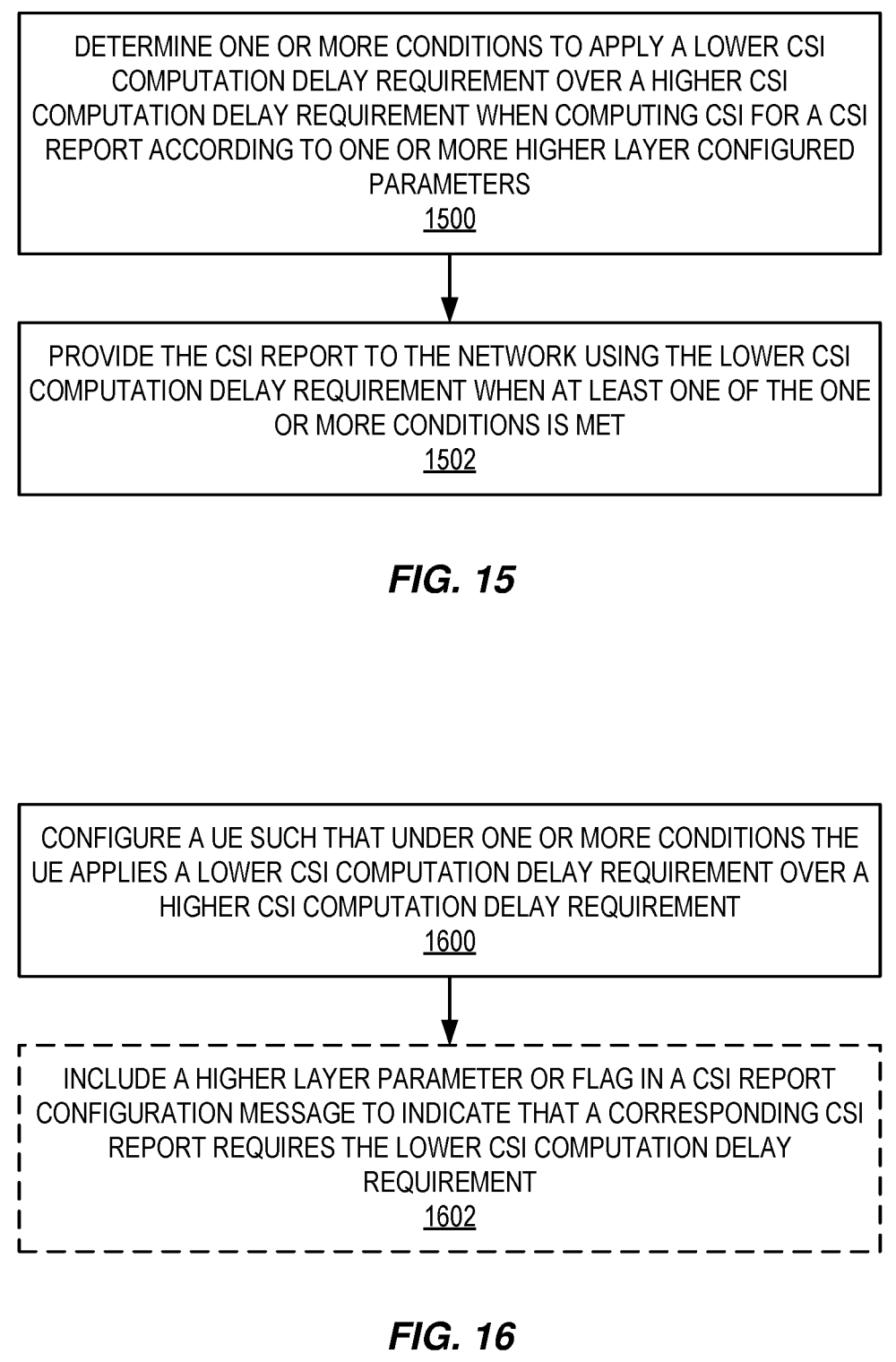

DETERMINE ONE OR MORE CONDITIONS TO APPLY A LOWER CSI COMPUTATION DELAY REQUIREMENT OVER A HIGHER CSI COMPUTATION DELAY REQUIREMENT WHEN COMPUTING CSI FOR A CSI REPORT ACCORDING TO ONE OR MORE HIGHER LAYER CONFIGURED PARAMETERS
1500

PROVIDE THE CSI REPORT TO THE NETWORK USING THE LOWER CSI COMPUTATION DELAY REQUIREMENT WHEN AT LEAST ONE OF THE ONE OR MORE CONDITIONS IS MET
1502

FIG. 15

CONFIGURE A UE SUCH THAT UNDER ONE OR MORE CONDITIONS THE UE APPLIES A LOWER CSI COMPUTATION DELAY REQUIREMENT OVER A HIGHER CSI COMPUTATION DELAY REQUIREMENT
1600

INCLUDE A HIGHER LAYER PARAMETER OR FLAG IN A CSI REPORT CONFIGURATION MESSAGE TO INDICATE THAT A CORRESPONDING CSI REPORT REQUIRES THE LOWER CSI COMPUTATION DELAY REQUIREMENT
1602

ULTRA-LOW LATENCY CSI TIMELINE FOR URLLC CSI REPORTING

RELATED APPLICATIONS

This application is a 35 U.S.C. § 371 national phase filing of International Application No. PCT/IB2021/056937, filed Jul. 29, 2021, which claims the benefit of U.S. provisional patent application Ser. No. 63/058,440, filed Jul. 29, 2020, the disclosures of which are hereby incorporated herein by reference in their entireties.

TECHNICAL FIELD

This disclosure relates to channel state information (CSI) reporting in telecommunications, and in particular to CSI reporting for Ultra-Reliable Low-Latency Communication (URLLC) scenarios.

BACKGROUND

The Third Generation Partnership Project (3GPP) Fifth Generation (5G) New Radio (NR) specification uses Cyclic Prefix Orthogonal Frequency Division Multiplexing (CP-OFDM) in both Downlink (DL) (i.e., from a network node, Next Generation Base Station (gNB), or other base station, to a User Equipment (UE)) and Uplink (UL) (i.e., from UE to network node, gNB, or other base station). Discrete Fourier Transform (DFT) spread Orthogonal Frequency Division Multiplexing (OFDM) is also supported in the UL. In the time domain, NR DL and UL are organized into equally sized subframes of 1 millisecond (ms) each. A subframe is further divided into multiple slots of equal duration. The slot length depends on subcarrier spacing. For subcarrier spacing of $\Delta f=15$ kilohertz (kHz), there is only one slot per subframe, and each slot consists of 14 OFDM symbols.

Different subcarrier spacing values are supported in NR. The supported subcarrier spacing values (also referred to as different numerologies) are given by $\Delta f=(15 \times 2^{\mu})$ kHz where $\mu \in \{0,1,2,3,4\}$ and $\Delta f=15$ kHz is the basic subcarrier spacing. The slot durations at different subcarrier spacings is given by $1/2^{\mu}$ ms.

DL Channel State Information (CSI) Feedback

For DL CSI feedback, NR has adopted an implicit CSI mechanism where a UE feeds back the DL CSI including typically a transmission Rank Indicator (RI), a Precoder Matrix Indicator (PMI), and Channel Quality Indicator (CQI) for each Codeword (CW). The CQI/RI/PMI report can be either wideband or subband based on CSI report configuration.

The RI corresponds to a recommended number of layers that are to be spatially multiplexed and thus transmitted in parallel over the effective channel; the PMI identifies a recommended precoding matrix to use; the CQI represents a recommended modulation level (e.g., Quadrature Phase Shift Keying (QPSK), 16-bit Quadrature Amplitude Modulation (16 QAM), etc.) and coding rate for each CW or Transport Block (TB). NR supports transmission of one or two CWs to a UE in a slot. There is thus a relation between a CQI and a Signal-to-Interference-Plus-Noise Ratio (SINR) of the spatial layers over which the CWs are transmitted.

In closed-loop precoding for the NR DL, the UE transmits, based on channel measurements in the DL, recommendations to the gNB of a suitable precoder to use. The gNB configures the UE to provide feedback according to CSI-ReportConfig and may transmit CSI Reference Signal (CSI-RS) and configure the UE to use measurements of CSI-RS to feedback recommended precoding matrices that the UE selects from a codebook. A single precoder that is supposed to cover a large bandwidth (wideband precoding) may be fed back. It may also be beneficial to match the frequency variations of the channel and instead feedback a frequency-selective precoding report (e.g., several precoders, one per subband). This is an example of the more general case of CSI feedback, which also encompasses feeding back other information than recommended precoders to assist the gNB in subsequent transmissions to the UE. Such other information may include CQIs as well as transmission RI. In NR, CSI feedback can be either wideband, where one CSI is reported for the entire channel bandwidth, or frequency-selective, where one CSI is reported for each subband, which is defined as a number of contiguous resource blocks ranging between 4-32 Physical Resource Blocks (PRBs) depending on the Band Width Part (BWP) size.

Given the CSI feedback from the UE, the gNB determines the transmission parameters it wishes to use to transmit to the UE, including the precoding matrix, transmission rank, and Modulation and Coding Scheme (MCS). These transmission parameters may differ from the recommendations the UE makes. The transmission rank, and thus the number of spatially multiplexed layers, is reflected in the number of columns of the precoder W. For efficient performance, it is important that a transmission rank that matches the channel properties is selected.

Channel State Information Reference Signals (CSI-RS)

For CSI measurement and feedback, CSI-RS are defined. A CSI-RS is transmitted on each transmit antenna (or antenna port) and is used by a UE to measure a DL channel between each of the transmit antenna ports and each of its receive antenna ports. The antenna ports are also referred to as CSI-RS ports. The supported number of antenna ports in NR are $\{1,2,4,8,12,16,24,32\}$. By measuring the received CSI-RS, a UE can estimate the channel that the CSI-RS is traversing, including the radio propagation channel and antenna gains. The CSI-RS for the above purpose is also referred to as Non-Zero Power (NZP) CSI-RS.

FIG. 1 is a schematic diagram of an example of transmission of a CSI-RS in Resource Elements (REs) of a transmission slot. NZP CSI-RS can be configured to be transmitted in certain REs in a slot and certain slots. This example shows CSI-RS REs for 12 antenna ports, where 1 RE per Resource Block (RB) per port is shown.

In addition, Interference Measurement Resource (IMR) is also defined in NR for a UE to measure interference. An IMR resource contains 4 REs, either 4 adjacent REs in frequency in the same OFDM symbol or 2 by 2 adjacent REs in both time and frequency in a slot. By measuring both the channel based on NZP CSI-RS and the interference based on an IMR, a UE can estimate the effective channel and noise plus interference to determine the CSI (i.e., rank, precoding matrix, and channel quality).

Furthermore, a UE in NR may be configured to measure interference based on one or multiple NZP CSI-RS resource.

CSI Framework in NR

In NR, a UE can be configured with multiple CSI reporting settings (each represented by a higher layer parameter CSI-ReportConfig with an associated identity ReportConfigID) and multiple CSI resource settings (each represented by a higher layer parameter CSI-ResourceConfig with an associated identity CSI-ResourceConfigId). Each CSI resource setting can contain multiple CSI resource sets (each represented by a higher layer parameter NZP-CSI-RS-ResourceSet with an associated identity NZP-CSI-RS-ResourceSetId for channel measurement or by a higher layer parameter CSI-IM-ResourceSet with an associated identity CSI-IM-ResourceSetId for interference measurement), and each NZP CSI-RS resource set for channel measurement can contain up to 8 NZP CSI-RS resources. For each CSI reporting setting, a UE feeds back a set of CSIs, which may include one or more of a CSI-RS Resource Indicator (CRI), a RI, a PMI and a CQI per CW, depending on the configured report quantity. The CSI(s) reported by the UE can be periodic, semi-persistent or aperiodic (triggered by the network).

Each reporting setting CSI-ReportConfig is associated with a single DL BWP (indicated by higher layer parameter BWP -Id) given in the associated CSI-ResourceConfig for channel measurement and contains the parameter(s) for one CSI reporting band.

Each CSI reporting setting contains at least the following information:

A CSI resource setting for channel measurement based on NZP CSI-RS resources (represented by a higher layer parameter resourcesForChannelMeasurement).

A CSI resource setting for interference measurement based on CSI Interference Measurement (CSI-IM) resources (represented by a higher layer parameter csi-IM-ResourcesForInterference).

Optionally, a CSI resource setting for interference measurement based on NZP CSI-RS resources (represented by a higher layer parameter nzp-CSI-RS-ResourcesForInterference).

Time-domain behavior, e.g., periodic, semi-persistent, or aperiodic reporting (represented by a higher layer parameter reportConfigType).

Frequency granularity, e.g., wideband or subband.

CSI parameters to be reported such as RI, PMI, CQI, L1-RSRP/L1_SINR and CRI in case of multiple NZP CSI-RS resources in a resource set is used for channel measurement (represented by a higher layer parameter reportQuantity, such as 'cri-RI-PMI-CQI,' 'cri-RSRP,' or 'ssb-Index-RSRP').

Codebook types, e.g., type I or II if reported, and codebook subset restriction.

Measurement restriction enabled or disabled.

Subband size. One out of two possible subband sizes is indicated, the value range for a subband size depends on the configured bandwidth of the DL BWP. One CQI/PMI (if configured for subband reporting) is fed back per subband.

For periodic and semi-static CSI reporting, only one NZP CSI-RS resource set can be configured for channel measurement and one CSI-IM resource set for interference measurement. For Aperiodic CSI (A-CSI) reporting, a CSI resource setting for channel measurement can contain more than one NZP CSI-RS resource set for channel measurement. If the CSI resource setting for channel measurement contains multiple NZP CSI-RS resource sets for A-CSI report, only one NZP CSI-RS resource set can be selected and indicated to a UE. For A-CSI reporting, a list of trigger states (given by the higher layer parameters CSI-AperiodicTriggerStateList) are configured. Each trigger state in CSI-AperiodicTriggerStateList contains a list of associated CSI-Report- Configs indicating the resource set Identifiers (IDs) for channel and optionally for interference. For a UE configured with the higher layer parameter CSI-AperiodicTriggerStateList, if a resource setting linked to a CSI-ReportConfig has multiple aperiodic resource sets, only one of the aperiodic CSI-RS resource sets from th resource setting is associated with the trigger state, and the UE is higher layer configured per trigger state per resource setting to select the one NZP CSI-RS resource set from the resource setting.

When the CSI-RS resource set in a CSI reporting setting contains multiple CSI-RS resources, one of the CSI-RS resources is selected by a UE and a CRI is also reported by the UE to indicate to the gNB about the selected CSI-RS resource in the resource set, together with RI, PMI and CQI associated with the selected CSI-RS resource. The network may then transmit the different CSI-RS resources using different Multiple-Input Multiple-Output (MIMO) precoders or by using different beam directions.

For A-CSI reporting in NR, more than one CSI reporting setting, each with a different CSI-RS resource set for channel measurement and/or different resource set for interference measurement can be configured and triggered at the same time, i.e., with a single trigger command in the DL control channel from the gNB to the UE. In this case, multiple CSI reports are measured, computed, aggregated and sent from the UE to the gNB in a single Physical UL Shared Channel (PUSCH) message.

As a general classification, NR categorizes a CSI report setting into wideband and subband frequency-granularity as follows:

wideband PMI/CQI reporting, beam reporting, hybrid CSI report, semi-open loop reporting and non-PMI feedback (with wideband CQI) is classified as wideband frequency-granularity CSI, whereas the other configurations of a CSI report setting are classified as having a subband frequency-granularity.

Only CSI report settings with wideband frequency-granularity are allowed to be periodically reported on short Physical UL Control Channel (PUCCH).

The following different reporting quantities are supported currently in NR for CSI feedback:

a single CRI, a single RI, a single PMI, and a single CQI, when higher layer parameter reportQuantity is set to 'cri-RI-PMI-CQI', a single CRI, a single RI, and a wideband PMI (i1), when higher layer parameter reportQuantity is set to 'cri-RI-i1', a single CRI, a single RI, a wideband PMI (i1), and a single CQI, when higher layer parameter reportQuantity is set to 'cri-RI-i1-CQI', a single CRI, a single RI, and a single CQI, when higher layer parameter reportQuantity is set to 'cri-RI-CQI', a single CRI, a single RI, a Layer Indicator (LI) which indicates which column of the precoder matrix of the reported PMI corresponds to the strongest layer, a PMI, and a CQI, when higher layer parameter reportQuantity is set to 'cri-RI-LI-PMI-CQI'.

Note that according to Table 6.3.1.1.2-3 of 3GPP Technical Specification (TS) 38.212, CRI does not need to be reported if there is only a single NZP CSI-RS resource in the CSI resource set used for channel measurements.

Aperiodic CSI-RS/IM and CSI Reporting

For both aperiodic CSI-RS/IM resources and A-CSI reports, the triggering is done jointly by transmitting a DL Control Information (DCI) Format 0_1 or a DCI Format 0_2 from the gNB to the UE, using the Physical DL Control Channel (PDCCH). These are the DCI formats which schedule PUSCH transmission where the A-CSI report is to be carried. The DCI Formats 0_1 and 0_2 contain a CSI request field which can be configured to be between 0 and 6 bits wide using higher layer configuration (e.g., Radio Resource Control (RRC)) from gNB to UE.

The CSI request field can thus contain at most $S_c=2^6=64$ codepoints. If this field is set to all zeros, no CSI is requested, and the DCI (with either format 0_1 or 0_2) only schedules a regular PUSCH transmission containing UL data. A non-zero codepoint on the other hand points to a so-called aperiodic trigger state configured by RRC from gNB to UE. An aperiodic trigger state is defined as a list of up to at most 16 aperiodic CSI report settings (e.g., CSI-ReportConfigs), each identified by a CSI report setting ID (e.g., CSI-ReportConfigId), for which the UE simultaneously should calculate CSI for and include in the scheduled PUSCH transmission. But typically, a much lower number of CSI report settings are defined in an aperiodic trigger state.

If a CSI report setting is linked with periodic/semi-persistent CSI resource setting(s), no further information is needed since there is only one resource set included in the CSI resource setting for channel/interference measurement in this case.

However, if the CSI report setting is linked with an aperiodic resource setting (which can comprise multiple CSI resource sets), which CSI-RS/IM resource set should be used for measurement must be indicated in DCI (either format 0_1 or 0_2). Hence, this allows the gNB, for a given CSI report setting, to dynamically switch which CSI-RS/IM resource shall be used for measurement each time the aperiodic report is triggered by DCI (either format 0_1 or 0_2), by configuring by RRC and indicating by DCI (either format 0_1 or 0_2) different aperiodic trigger states. This means that the aperiodic NZP CSI-RS resource set for channel measurement, the aperiodic CSI-IM resource set for interference measurement (if that is used) and the aperiodic NZP CSI-RS resource set for interference measurement (if used) to use for a given CSI report setting is also included in the aperiodic trigger state definition.

For aperiodic NZP CSI-RS, the Quasi Co-Located (QCL) source to use (e.g., the Transmission Configuration Indicator (TCI) state) is also configured in the aperiodic trigger state, which enables the gNB to dynamically switch UE receive beam assumptions for the reception of the NZP CSI-RS.

FIG. 2 is a schematic diagram of the aperiodic trigger state definition.

It is possible to configure up to 128 aperiodic trigger states via RRC. However, the number of codepoints of the CSI request bitfield in DCI (with format 0_1 or 0_2) only ranges between 0-63. Therefore, it is possible that more trigger states are configured in RRC than can be indicated with the DCI field. When this is the case, e.g., M aperiodic trigger states are configured in RRC but the CSI request bitfield (with bitwidth $N_{TS}=0, \ldots, 6$) only contains $S_c=2^{N_{TS}}-1<M$ non-zero codepoints, an intermediary sub-selection, or mapping, between the $S_c$ codepoints and the M RRC configured trigger states needs to be performed. This sub-selection is performed by transmitting a Media Access Control (MAC) Control Element (CE) sub-selection command.

The aperiodic CSI-RS/IM is essentially a one-shot measurement which is only present for a single time instance and is only used to determine CSI for a single aperiodic report. The position, in time, of the aperiodic CSI-RS/IM is defined as a slot offset relative to the slot where the DCI containing the trigger was received. The slot offset is defined on a CSI-RS resource set level and the offset allows the UE to use some time to complete the CSI measurements and calculation of the CSI reports, and prepare the UL transmission of the reports. For aperiodic CSI-IM, there is no explicit slot offset defined but rather it is assumed that the CSI-IM and CSI-RS is present in the same slot to enable efficient CSI processing at the UE.

CSI Processing Criteria and UE Capability for CSI Reporting

In Long Term Evolution (LTE), the concept of a CSI process was introduced in Rel-11 for the purpose of supporting Coordinated Multi-Point (CoMP), i.e., feedback of several different CSI reports corresponding to multiple transmission points. Each CSI process was associated with a specific kind of reporting configuration (i.e., CSI content and measurement resource) and the UE is assumed to always be able to provide CSI for all its supported CSI processes on a carrier. Thus, for LTE, the CSI computation capability reported by the UE is the support of a number X of reporting configurations. However, such a tight coupling between CSI capability and configured reporting configurations X was not suitable for the more flexible NR CSI framework.

Instead, the NR CSI computation capability separates the number of supported configured CSI report settings and the number of supported simultaneous CSI calculations. That is, the concept of CSI process is generalized in NR with the introduction of the CSI Processing Unit (CPU), where the number of CPUs is equal to the number of simultaneous CSI calculations supported by the UE. The CPU can be seen as a generic CSI calculation engine which can process any kind of CSI report. That is, the CPUs are a pool of computational resources. For instance, the UE can indicate support for 4 configured CSI report settings but only support a single simultaneous CSI calculation (e.g., supporting a single CPU). This means that the gNB can trigger any of the 4 different CSI reports, but has to multiplex the different CSI reports calculations in time. The different configured CSI report settings may for instance correspond to different codebook configurations (i.e., Type I and Type II codebooks), different types of beam reports (e.g., P2 and P3), different CSI hypotheses used in CoMP operation or CSI reports corresponding to different carriers.

The framework works as follows. When calculation of a CSI report is about to proceed (e.g., either when the UE gets triggered with an A-CSI report or when the computation starts for a periodic or semi-persistent CSI report) the CSI report is allocated to one or multiple available CPU(s). If there are not enough CPUs available (e.g., because the UE already has ongoing processing of other CSI reports) an additional CSI reporting allocated by the gNB does not have to be calculated by the UE and the UE can instead report stale CSI to the gNB, such as a previously calculated CSI report stored in memory or simply padding the CSI report with dummy bits. The CSI report is not dropped in this case, but some content is always transmitted in order to not change the rate matching procedures for the PUSCH or PUCCH transmission, which could be error prone. In practice, the gNB should strive for only triggering/configuring as many CSI reports as the UE is capable of handling so that stale CSI does not need to be reported by the UE.

Each CSI report that is committed for calculation by the UE thus occupies a number $O_{CPU}$ CPUs from a starting allocation time until the last symbol of the physical channel (i.e., PUCCH or PUSCH) carrying the CSI report to the gNB has finished transmitting from the UE, whereby the $$O_{CPU}^{(n)}$$

CPUs are then released. For A-CSI report, the starting allocation time of the CPU(s) is the last symbol of the PDCCH containing the DCI which triggered the report, while for periodic and semi-persistent CSI reports, the CPUs are allocated from the time of the occurrence of the latest CSI-RS/IM resource used to calculate the particular report. That is, for periodic/semi-persistent reports, the UE can be assumed to start calculation of the CSI report as soon as it has received the latest occurrence of the measurement resource.

The number of CPUs $O_{CPU}$ occupied by a certain CSI report depends on the content of the report. For non-beam related CSI reports (i.e., when the reportQuanity is not equal to 'cri-RSRP', 'ssb-Index-RSRP' or 'none'), the CSI report occupies as many CPUs as the number of CSI-RS resources in the CSI-RS resource set for channel measurement. This is because a UE may, in the worst case, need to calculate a complete CSI report for each CSI-RS resource in parallel in order to determine which CSI-RS resource is optimal and shall be selected with the CRI (of course, a UE implementation may use simpler approaches to determine the CRI, such as comparing the signal strength of the resources). For beam-related reports, on the other hand, the required computations are not as complex and only a single CPU ($O_{CPU}=1$) is occupied, even if multiple CSI-RS resources are included in the CSI-RS resource set for channel measurement. The gNB also has the possibility to trigger an aperiodic Tracking Reference Signal (TRS) using the triggering mechanisms of the CSI framework; however, this does not occupy any CPUs and it is instead assumed that the UE has dedicated resources for TRS processing.

If multiple CSI reports are about to be allocated to use CPUs on a given OFDM symbol, they are ordered according to a set of priority rules. That is, if N CSI reports start occupying their respective CPUs on the same OFDM symbol on which $N_{CPU}-L$ CPUs are unoccupied, where each CSI report n=0, . . . , N−1 corresponds to $$O_{CPU}^{(n)},$$

the UE is not required to update the N−M requested CSI reports with lowest priority where M ($0 \leq M \leq N$) is the largest value such that $$\sum_{n=0}^{M-1} O_{CPU}^{(n)} \leq N_{CPU} - L$$

holds.

In terms of the number of CPUs $O_{CPU}$ occupied for a number of symbols for a given CSI report, the following are defined in 3GPP TS 38.214:

For beam-related reports with higher layer parameter reportQuantity in CSI-ReportConfig set to 'cri-RSRP', 'ssb-Index-RSRP', 'cri-SINR', or 'ssb-Index-SINR', $O_{CPU}=1$.

For CSI reports with higher layer parameter reportQuantity in CSI-ReportConfig set to 'cri-RI-PMI-CQI', 'cri-RI-i1', 'cri-RI-i1-CQI', 'cri-RI-CQI', or 'cri-RI-LI-PMI-CQI', if the following conditions are met, then $O_{CPU}=N_{CPU}$ CSI report is aperiodically triggered without transmitting a PUSCH with either TB or Hybrid Automated Repeat Request-Acknowledgment (HARQ-ACK) or both when L=0 CPUs are occupied, CSI corresponds to a single CSI with wideband frequency-granularity, at most 4 CSI-RS ports in a single NZP CSI-RS resource without reporting CRI with codebook-Type in CSI report setting is set to 'typeI-SinglePanel' or the reportQuantity is set to 'cri-RI-CQI' otherwise, $O_{CPU}=K_S$, where $K_S$ is the number of NZP CSI-RS resources in the CSI-RS resource set for channel measurement.

FIG. 3 is a schematic diagram illustrating the concept of CPU occupation. The UE is assumed to have two CPUs available, and where CPU #1 gets allocated by the Periodic CSI (P-CSI) report in slot 0, which is the slot of the latest NZP CSI-RS occurrence (no later than the CSI reference resource) used by the P-CSI report. While the P-CSI report is calculated, the UE gets triggered with two consecutive A-CSI reports, #1 and #2, which are allocated to CPU #2. After both CPUs are released, the UE gets triggered with two simultaneous A-CSI reports, #3 and #4, which respectively occupy CPU #1 and CPU #2. Before these CSI reports have finished calculating, the UE gets triggered with another A-CSI report #5 in slot 9. However, since there are no more CPUs available, that CSI report is not computed by the UE and instead a stale or dummy CSI is reported for A-CSI report #5. The event of CSI report #5 being triggered while there are no unoccupied CPUs to process CSI report #5 is dented as 'overflow' in FIG. 3 which starts in slot 9.

CSI Timeline Requirement

When A-CSI reports are triggered by PDCCH, not only does the UE need to have available computational resources to calculate the report, as was described in the previous section, it also needs enough time to perform the computation. In LTE, scheduling of PUSCH, where A-CSI is carried, used a fixed scheduling offset of 4 subframes, corresponding to 4 ms, and it was assumed that any triggered A-CSI report could be calculated during this time period and no additional timing requirement for CSI was needed. However, since NR features both a more diverse set of CSI content with different computational complexities, as well as flexible scheduling offset of the UL transmissions to carry the CSI report, a separate CSI timeline requirement is needed to ensure that the PUSCH carrying the CSI is not scheduled too aggressively.

The CSI reports (e.g., each CSI report setting) are classified into three Latency Classes, each with different timing requirements. Low Latency CSI is classified as CSI which fulfils the following criteria:

Wideband frequency-granularity.

A single CSI-RS resource (i.e., no CRI reporting) with at most 4 CSI-RS ports.

PMI reporting with Type I Single-Panel codebook or non-PMI reporting.

The remaining types of CSI content require more computations, and are classified as High Latency CSI (excluding beam reporting) while beam reporting is defined as a separate (i.e., the third) CSI Latency Class.

FIG. 4 illustrates timing requirements for A-CSI reporting. Two timing requirements for A-CSI reporting are defined in NR. The first requirement is defined as the minimum number of OFDM symbols Z between the last symbol of the PDCCH triggering the A-CSI report and the first symbol of the PUSCH which carries the CSI report. During this time, the UE needs to be able to decode the PDCCH, perform possible CSI-RS/IM measurements (if it does not already have an up-to-date previous channel/interference measurement stored in its memory), perform possible channel estimation, calculate the CSI report and perform UL Control Information (UCI) multiplexing with UL Shared Channel (UL-SCH).

However, if aperiodic CSI-RS/IM is used with the A-CSI report, this first requirement alone does not guarantee that the UE has sufficient time to compute the CSI, since the aperiodic CSI-RS could potentially be triggered close to the allowed time occasions for the PUSCH transmission (i.e., just after the period indicated by Z). Therefore, the second requirement is defined as the minimum number of OFDM symbols Z' between the last symbol of the aperiodic CSI-RS/IM used to calculate the report and the first symbol of the PUSCH which carries the CSI report. This is illustrated in FIG. 4, where NZP denotes the location of the NZP CSI-RS/CSI-IM used for computing the CSI report.

The numerical values for timeline requirements (Z,Z') for the three CSI latency classes are given in Table 1, for each subcarrier configuration $\mu$ (where $\mu$ is counted in the smallest Subcarrier Spacing (SCS) if different numerologies are used for PDCCH, PUSCH and/or CSI-RS). In practice, the only difference between the Z and Z' timing requirements is that the Z requirement should additionally encompass DCI decoding time, which is why the Z requirement is typically a few symbols larger than the corresponding Z' value.

For Low/High Latency CSI Classes, the timeline requirement is fixed in specification while the timeline requirement for beam reporting depends on the UE's reported capability on beam report timing ($X_\mu$) and beam switch timing ($KB_i$). If the CSI report is multiplexed with UL-SCH data, some additional OFDM symbols are added to the requirement to account for UCI and UL-SCH multiplexing time. If more than one CSI report setting is aperiodically triggered by a PDCCH, then the largest (Z,Z') values across different reports are used for all the CSI reports. That is, if one High Latency and one Low Latency CSI report is triggered, the High Latency CSI timing requirement is used. In 3GPP TS 38.214, the CSI timing requirements given in Table 1 below are referred to as 'CSI computation delay requirement 2' (see Table 5.4-2 in TS 38.214).

TABLE 1

| Timing requirement for Low Latency CSI, High Latency CSI and Beam reports (reproduced from Table 5.4-2 of 3GPP TS 38.214) | | | | | |
|---|---|---|---|---|---|
| | Low Latency CSI [symbols] | | High Latency CSI [symbols] | | Beam reporting [symbols] |
| $\mu$ | $Z_1$ | $Z'_1$ | $Z_2$ | $Z'_2$ | $Z_3$ | $Z'_3$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min(44, $X_3 \pm KB_1$) | $X_3$ |
| 3 | 97 | 85 | 152 | 140 | min(97, $X_4 \pm KB_2$) | $X_4$ |

If the Z-criterion (or Z'-criterion) is not fulfilled and the gNB triggers the PUSCH too close to the PDCCH (or the aperiodic CSI-RS/IM), the UE can simply ignore the scheduling DCI if the UE is not also scheduled with UL-SCH or HARQ-ACK, and not transmit anything. If UL-SCH or HARQ-ACK needs to be multiplexed on the PUSCH, however, the UE still transmits the PUSCH but pads the CSI report with dummy bits or feeds back a stale CSI report.

Additionally, there is a special requirement for ultra-low latency CSI with a very short timeline. This type of CSI report is for instance useful for Ultra-Reliable Low-Latency Communication (URLLC) type of applications where an "instant" CSI report may be required to be able to quickly schedule e.g., high priority data. Since this timing requirement is very aggressive, it is only applied if a single Low Latency CSI report is triggered, without multiplexing with either UL-SCH or HARQ-ACK and only when the UE has all of its CPUs unoccupied. The UE can then allocate all of its computational resources to compute this CSI in a very short time. Hence, all of the CPUs become occupied for this duration and the UE cannot calculate any other CSI during this time. The ultra-low latency timing requirement is given in Table 2. In 3GPP TS 38.214, the ultra-low latency CSI timing requirement is referred to as 'CSI computation delay requirement 1' (see Table 5.4-1 in TS 38.214).

TABLE 2

| Ultra-low latency CSI timing requirement (reproduced from Table 5.4-1 of 3GPP TS 38.214) | | |
|---|---|---|
| | $Z_1$ [symbols] | |
| $\mu$ | $Z_1$ | $Z'_1$ |
| 0 | 10 | 8 |
| 1 | 13 | 11 |
| 2 | 25 | 21 |
| 3 | 43 | 36 |

If the UE is triggered with a single Low Latency CSI report without multiplexing with UL-SCH and/or HARQ-ACK, but where at least one CPU is already occupied, the less stringent requirement on latency according to Table 1 is applied.

According to 3GPP TS 38.214, which CSI computation delay requirement a UE should apply for a given CSI report is defined according to the following rule:

If the following conditions are met, the ultra-low latency CSI timing requirement of Table 2 (i.e., CSI computation delay requirement 1 in Table 5.4-1 of TS 38.214) is applicable CSI report is aperiodically triggered without transmitting a PUSCH with either TB or HARQ-ACK or both when L=0 CPUs are occupied, CSI corresponds to wideband frequency-granularity, at most 4 CSI-RS ports in a single NZP CSI-RS resource without reporting CRI with codebookType in CSI report setting is set to 'typeI-SinglePanel' or the reportQuantity is set to 'cri-RI-CQI' else if the following conditions are met, the low latency CSI timing requirement of Table 1 (i.e., the $Z_1$ and $Z'_1$ values corresponding to the CSI computation delay requirement 2 in Table 5.4-2 of TS 38.214)

CSI corresponds to a single CSI with wideband frequency-granularity, at most 4 CSI-RS ports in a single NZP CSI-RS resource without reporting CRI with codebookType in CSI report setting is set to 'typeI-SinglePanel' or the reportQuantity is set to 'cri-RI-CQI' else, the high latency CSI timing requirement of Table 1 (i.e., the $Z_2$ and $Z'_2$ values corresponding to the CSI computation delay requirement 2 in Table 5.4-2 of TS 38.214).

TCI States

Demodulation Reference Signals (DMRS) are used for coherent demodulation of Physical DL Shared Channel (PDSCH). The DMRS is confined to RBs carrying the associated PDSCH and is mapped on allocated REs of the OFDM time-frequency grid in NR such that the receiver can efficiently handle time/frequency-selective fading radio channels. A PDSCH can have one or multiple DMRS, each associated with an antenna port. The antenna ports used for PDSCH are indicated in DCI scheduling the PDSCH.

Several signals can be transmitted from different antenna ports in a same location. These signals can have the same large-scale properties, for instance in terms of Doppler shift/spread, average delay spread, or average delay, when measured at the receiver. These antenna ports are then said to be QCL. The network can then signal to the UE that two antenna ports are QCL. If the UE knows that two antenna ports are QCL with respect to a certain parameter (e.g., Doppler spread), the UE can estimate that parameter based on a reference signal transmitted from one of the antenna ports and use that estimate when receiving another reference signal or physical channel the other antenna port. Typically, the first antenna port is represented by a measurement reference signal such as CSI-RS (known as a source reference signal) and the second antenna port is a DMRS (known as a target reference signal) for PDSCH reception.

In NR, a QCL relationship between a DMRS in PDSCH and other reference signals is described by a TCI state. A UE can be configured through RRC signaling with up to 128 TCI states in Frequency Range 2 (FR2) and up to 8 TCI states in Frequency Range 1 (FR1), depending on UE capability. Each TCI state contains QCL information, for the purpose of PDSCH reception. A UE can be dynamically signaled by one or two TCI states in the TCI field in a DCI scheduling a PDSCH.

PDSCH Transmission Over Multiple Transmission/Reception Points or Panels (TRPs)

In one scenario, DL data is transmitted over multiple Transmission/Reception Points (TRPs) in which different MIMO layers are transmitted over different TRPs. This is referred to as a Non-Coherent Joint Transmission (NC-JT). In another scenario, different time/frequency resources may be allocated to different TRPs and one or multiple PDSCH(s) is transmitted over different TRPs. Two ways of scheduling multi-TRP transmission are specified in NR Rel-16: multi-PDCCH based multi-TRP transmission and single-PDCCH based multi-TRP transmission. The multi-PDCCH based multi-TRP transmission and single-PDCCH based multi-TRP transmission can be used to serve DL Enhanced Mobile Broadband (eMBB) traffic as well as DL URLLC traffic to the UE.

Single-PDCCH Based NC-JT or Scheme 1a

A PDSCH may be transmitted to a UE from multiple TRPs. Since different TRPs may be located in different physical locations and/or have different beams, the propagation channels can be different. To facilitate receiving PDSCH data from different TRPs or beams, a UE may be indicated with two TCI states, each associated with a TRP or a beam, by a single codepoint of a TCI field in a DCI.

FIG. 5 illustrates an example of PDSCH transmission over two TRPs using a single DCI. Different layers of a PDSCH with a single CW (e.g., CW0) are sent over two TRPs, each associated with a different TCI state. In this case, two DMRS ports, one for each layer, in two Code Division Multiplexing (CDM) groups are also signaled to the UE. A first TCI state is associated with the DMRS port in a first CDM group, and a second TCI state is associated with the DMRS port in a second CDM group. This approach is often referred to as NC-JT or Scheme 1a in NR Rel-16 3GPP discussions.

Transmitting PDSCH over multiple TRPs can also be used to improve PDSCH transmission reliability for URLLC applications. A number of approaches are introduced in NR Rel-16 including "FDMSchemeA","FDMSchemeB", "TDMSchemeA"and Slot based TDM scheme. Note that the terminology Scheme 4 is used in the 3GPP discussions involving Slot based TDM scheme in NR Rel-16.

FDMSchemeA and FDMSchemeB

FIG. 6 illustrates an example of multi-TRP PDSCH transmission with FDMSchemeA. A PDSCH is sent over TRP1 in Precoding RB Groups (PRGs) {0,2,4} and over TRP2 in PRGs {1,3,5}. The transmission from TRP1 is associated with TCI state 1, while the transmission from TRP2 is associated with TCI state 2. Since the transmissions from TRP1 and TRP2 are non-overlapping in the case of FDMSchemeA, the DMRS ports are the same (i.e., DMRS port 0 used for both transmissions). The PDSCH is scheduled by a PDCCH which is sent over TRP1.

FIG. 7 illustrates an example data transmission with FDMSchemeB. PDSCH #1 is transmitted in PRGs {0,2,4} from TRP1, and PDSCH #2 with the same TB is transmitted in PRGs {1,3,5} from TRP2. The transmission from TRP1 is associated with TCI state 1, while the transmission from TRP2 is associated with TCI state 2. Since the transmissions from TRP1 and TRP2 are non-overlapping in the case of FDMSchemeB, the DMRS ports are the same (i.e., DMRS port 0 used for both transmissions). The two PDSCHs carry the same encoded data payload but with a same or different redundancy version so that the UE can do soft combining of the two PDSCHs to achieve more reliable reception.

TDMSchemeA

FIG. 8 illustrates an example data transmission with TDMSchemeA in which PDSCH repetition occurs in mini-slots of 4 OFDM symbols within a slot. Each PDSCH can be associated with a same or different Redundancy Version (RV). The transmission of PDSCH #1 from TRP1 is associated with a first TCI state, while the transmission of PDSCH #2 from TRP2 is associated with a second TCI state.

Slot Based TDM Scheme or Scheme 4

FIG. 9 illustrates an example multi-TRP data transmission with Slot based TDM scheme. 4 PDSCHs (i.e., PDSCH transmission occasions) for a same TB are transmitted over 2 TRPs and in 4 consecutive slots. Each PDSCH is associated with a different RV. The transmission of odd numbered PDSCHs from TRP1 are associated with a first TCI state, while the transmission of even numbered PDSCHs from TRP2 is associated with a second TCI state.

In fact, slot based TDM scheme is also applicable when PDSCH is transmitted from a single TRP with a single TCI state indicated in the scheduling DCI.

For all the single-PDCCH based DL multi-TRP PDSCH schemes, a single DCI transmitted from one TRP is used to schedule multiple PDSCH transmissions over two TRPs. The network configures the UE with multiple TCI states via RRC, and a new MAC CE was introduced in NR Rel-16. This MAC CE can be used to map a codepoint in the TCI field to one or two TCI states.

Problems with Existing Solutions

There currently exist certain challenge(s). The ultra-low latency CSI timing is useful when the gNB needs to rapidly schedule URLLC data and thus acquire CSI quickly to use a correct link adaptation for the URLLC transmission. However, the ultra-low latency timing can only be applied when the UE is not already calculating any other CSI report (i.e., $L=0$), which is quite restrictive. In practical scenarios, the UE may be served with different types of traffic where some of them are URLLC traffic requiring ultra-low latency CSI while some other types are eMBB traffic where ultra-low latency CSI is less critical.

Furthermore, according to the current conditions defined in 3GPP TS 38.214, ultra-low latency CSI or even low-latency CSI timing requirement are only possible when CSI is measured on a single CSI-RS resource. This is applicable for single TRP scenarios where single CSI-RS is transmitted from the single TRP. However, ultra-low latency CSI timing requirement is not applicable to CSI feedback for multi-TRP URLLC schemes.

In addition, according to the current conditions defined in 3GPP TS 38.214, CSI reports with sub-band frequency granularity and/or CSI reports associated with measurements on CSI-RS with more than 4 CSI-RS ports will have to follow the high latency CSI timing requirement.

Using high-latency CSI timing requirement will result in delayed CSI reports or stale CSI reports that are not suitable for URLLC scheduling which require low latency and high reliability. Hence, it is a problem how to support ultra-low latency CSI feedback in NR for URLLC use cases involving CSI for multi-TRP URLLC schemes, parallel CSI processing with $L>0$, and CSI feedback for more than 4 ports.

SUMMARY

Systems and methods described herein provide Channel State Information (CSI) computation with ultra-low latency, enabling such CSI computation to be used for more Ultra-Reliable Low-Latency Communication (URLLC) use cases.

In some embodiments, a method is performed by a User Equipment (UE) of reporting CSI to a network. The method includes determining one or more conditions to apply a lower CSI computation delay requirement over a higher CSI computation delay requirement when computing CSI for a CSI report according to one or more higher layer configured parameters; and providing the CSI report to the network using the lower CSI computation delay requirement when at least one of the one or more conditions is met.

In some embodiments, the lower CSI computation delay requirement is an ultra-low latency CSI computation delay.

In some embodiments, the one or more conditions comprise a number L of CSI Processing Units (CPUs) occupied when the CSI report is triggered being within an upper limit $L_0$, where $L_0$ is an integer greater than 0. In some embodiments, the upper limit $L_0$ is higher layer configured to the UE by the network. In some embodiments, the upper limit $L_0$ is a UE capability reported by the UE to the network.

In some embodiments, the one or more conditions comprise the CSI report being aperiodically triggered to be transmitted on a Physical Uplink Shared Channel (PUSCH) that also carries Uplink Shared Channel (UL-SCH) data, a Hybrid Automated Repeat Request-Acknowledgment (HARQ-ACK) or both the UL-SCH data and the HARQ-ACK.

In some embodiments, the one or more conditions comprise a Non-Zero Power (NZP) CSI Reference Signal (CSI-RS) resource used for channel measurement for the CSI report having an upper limit $C_0$ CSI-RS ports, where $C_0$ is greater than 4. In some embodiments, the upper limit $C_0$ is higher layer configured to the UE by the network. In some embodiments, the upper limit $C_0$ is a UE capability reported by the UE to the network.

In some embodiments, the one or more conditions comprise the CSI report being based on more than one Non-Zero Power (NZP) CSI-RS resource. In some embodiments, CSI parameters in the CSI report are based on joint channel measurements performed on the more than one NZP CSI-RS resource. In some embodiments, the more than one NZP CSI-RS resource used for channel measurement are reported via more than one CSI-RS Resource Indicators (CRIs) as part of the CSI report.

In some embodiments, the one or more conditions comprise the CSI report being triggered to be carried on a channel having other signals or data. In some embodiments, the one or more conditions further comprise the CSI report being an Aperiodic CSI (A-CSI) report triggered to be carried on a PUSCH with payload data. In some embodiments, the lower CSI computation delay requirement is applied when computing the CSI for the A-CSI report.

In some embodiments, a first set of conditions is used by the UE for determining if a first CSI computation delay requirement should be applied over a second CSI computation delay requirement when the UE is configured with the one or more higher layer configured parameters; and a second set of conditions is used by the UE for determining if the first CSI computation delay requirement should be applied over the second CSI computation delay requirement when the UE is not configured with the one or more higher layer configured parameters.

In some embodiments, a number $N'_{CPU}$ of CPUs is dedicated for one or more CSI computations based on the lower CSI computation delay requirement, where $N'_{CPU}$ is different from a number $N_{CPU}$ of CPUs to be used for one or more CSI computations based on the higher CSI computation delay requirement.

In some embodiments, a UE for reporting CSI includes processing circuitry configured to perform the steps of any of the above embodiments.

In some embodiments, a method is performed by a network node for configuring CSI reporting by a UE. The method includes configuring the UE such that under one or more conditions the UE applies a lower CSI computation delay requirement over a higher CSI computation delay requirement.

In some embodiments, the lower CSI computation delay requirement is an ultra-low latency CSI computation delay.

In some embodiments, the method further comprises including a higher layer parameter or flag in a CSI report configuration message to indicate that a corresponding CSI report requires the lower CSI computation delay requirement. In some embodiments, the higher layer parameter or flag is included in a CSI-ReportConfig information element or as part of another field within CSI-ReportConfig. In some embodiments, the higher layer parameter or flag is configured in a CSI-AssociatedReportConfigInfo field.

In some embodiments, a network node includes processing circuitry configured to perform the steps of any of the above embodiments.

The solutions proposed herein can apply the ultra-low latency timing requirement to the following URLLC scenarios:

a) CSI computation for URLLC schemes that involve multiple Transmission/Reception Point (TRP) transmissions;

b) CSI computation for URLLC while at least one CPU is occupied for another CSI computation (i.e., when L>0); and c) CSI computation for URLLC with more than 4 CSI-RS ports used for channel measurements.

As a result, the solutions proposed reduce the CSI reporting latency which helps in improving the reliability of URLLC Downlink (DL) transmissions.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 2 is a schematic diagram of an aperiodic trigger state definition.

FIG. 11 illustrates an example of a CSI-AperiodicTriggerStateList information element with a higher layer flag configured in the CSI-AssociatedReportConfigInfo field according to embodiments described herein.

FIG. 12 illustrates an example of Multiple-Input Multiple-Output (MIMO) capability parameter reporting according to embodiments described herein.

FIG. 13 illustrates another example of MIMO capability parameter reporting according to embodiments described herein.

FIG. 14 is a flowchart illustrating a method in accordance with particular embodiments.

FIG. 15 is a flowchart illustrating another method in accordance with particular embodiments.

FIG. 16 is a flowchart illustrating another method in accordance with particular embodiments.

DETAILED DESCRIPTION

Figure 1:
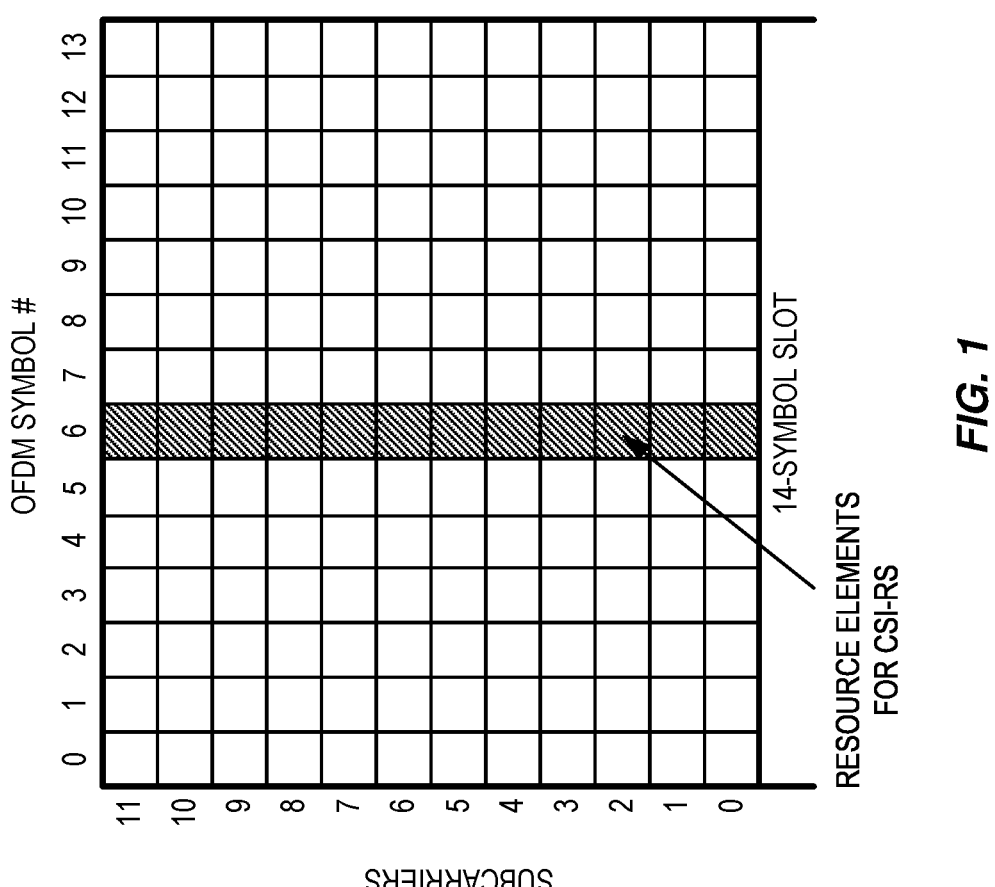
FIG. 1 is a schematic diagram of an example of transmission of a Channel State Information (CSI) Reference Signal (CSI-RS) in Resource Elements (REs) of a transmission slot.
Figure 3:
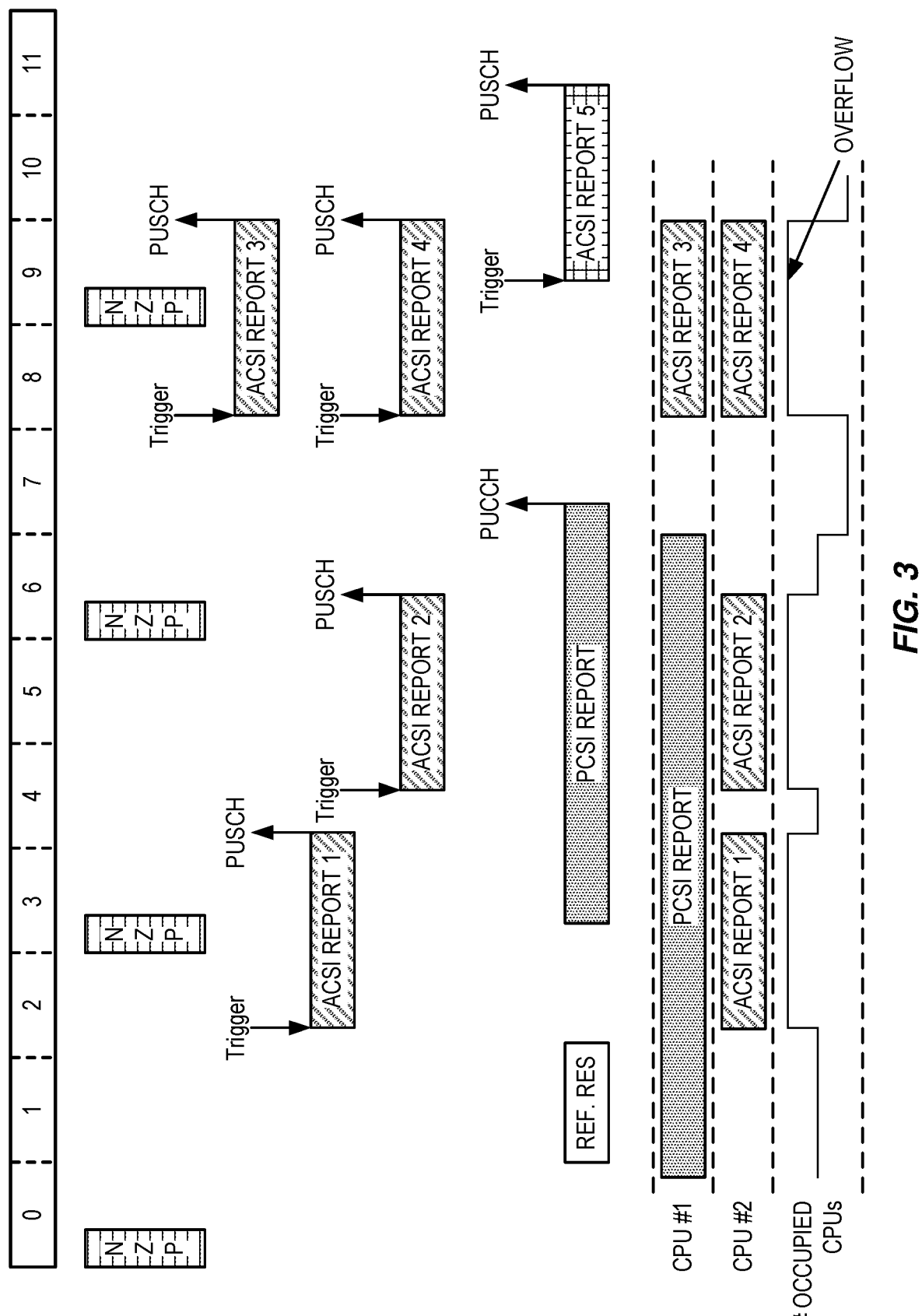
FIG. 3 is a schematic diagram illustrating the concept of CSI Processing Unit (CPU) occupation.
Figure 4:
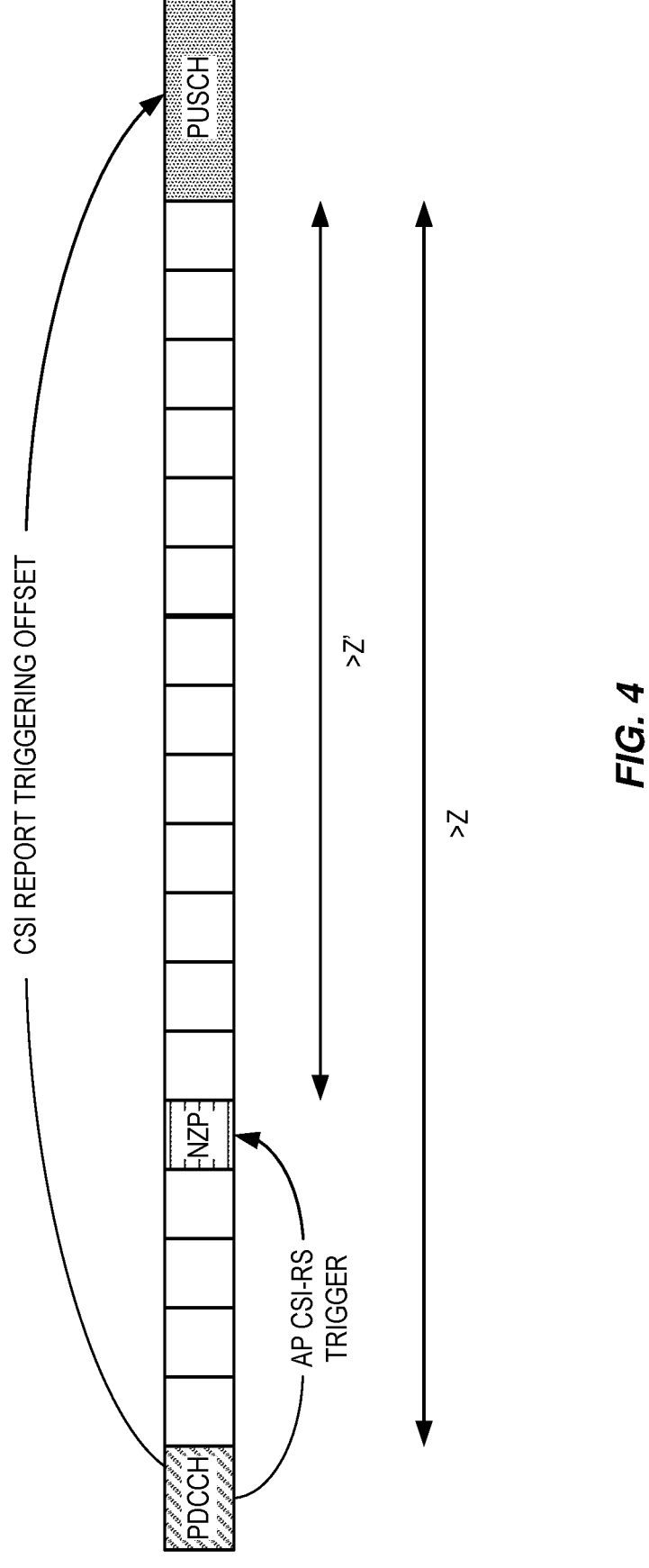
FIG. 4 illustrates timing requirements for Aperiodic CSI (A-CSI) reporting.
Figure 5:
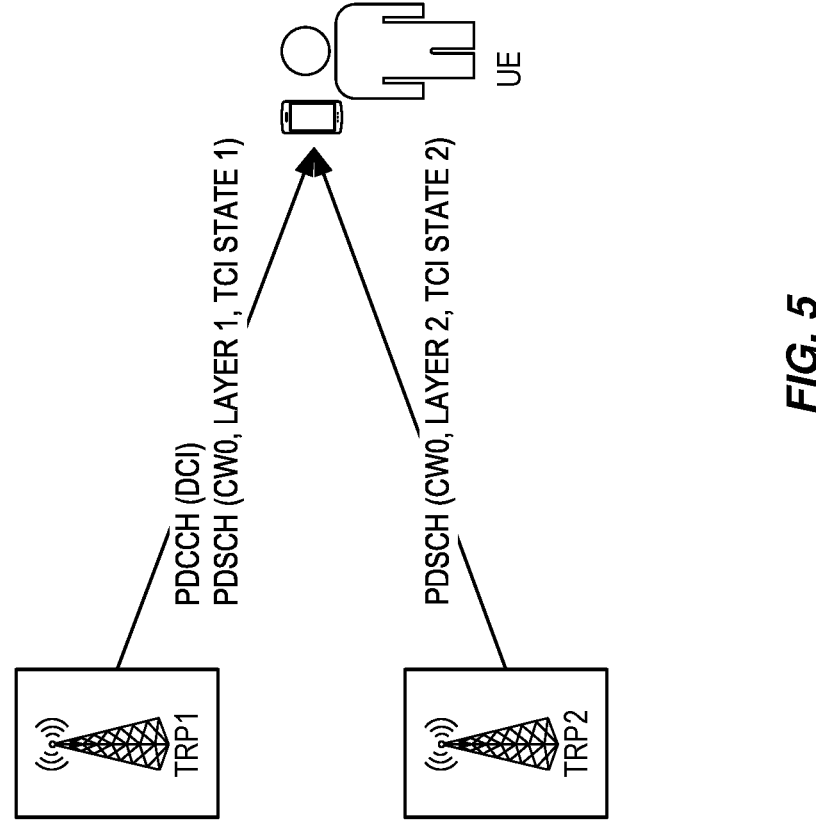
FIG. 5 illustrates an example of Physical Downlink Shared Channel (PDSCH) transmission over two Transmission/Reception Points (TRPs) using a single Downlink Control Information (DCI).
Figure 6:
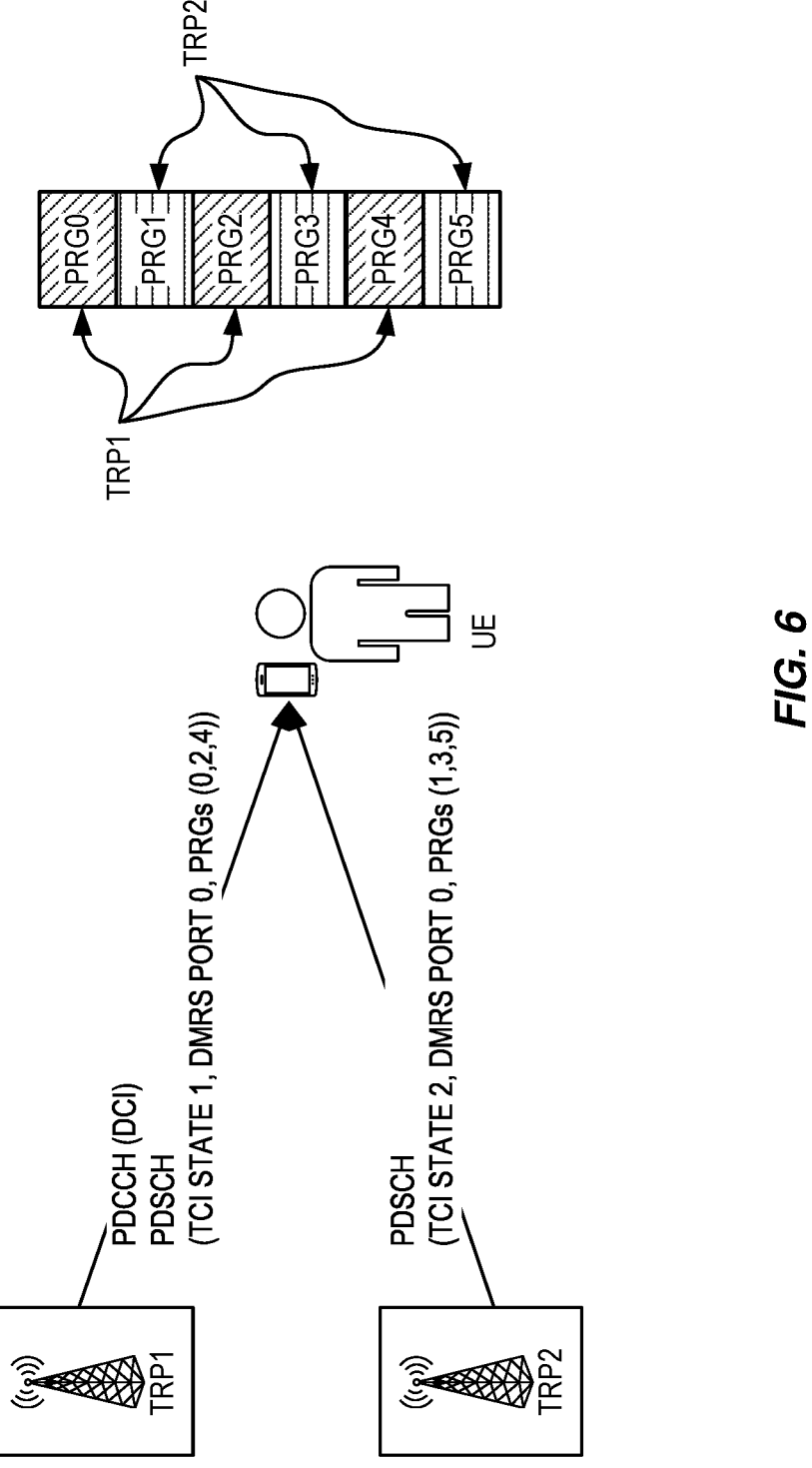
FIG. 6 illustrates an example of multi-TRP PDSCH transmission with FDMSchemeA.
Figure 7:
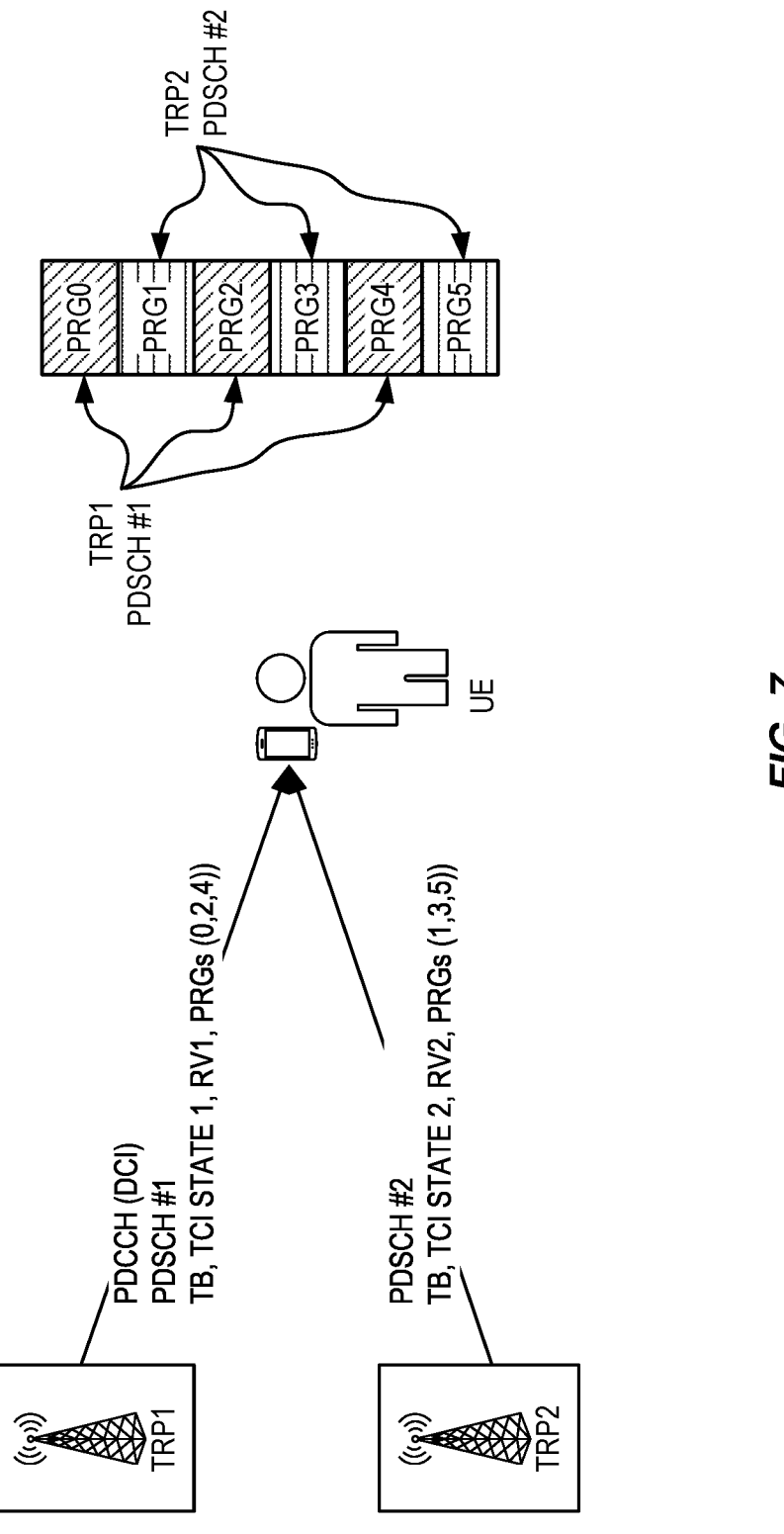
FIG. 7 illustrates an example data transmission with FDMSchemeB.
Figures 8, 9:
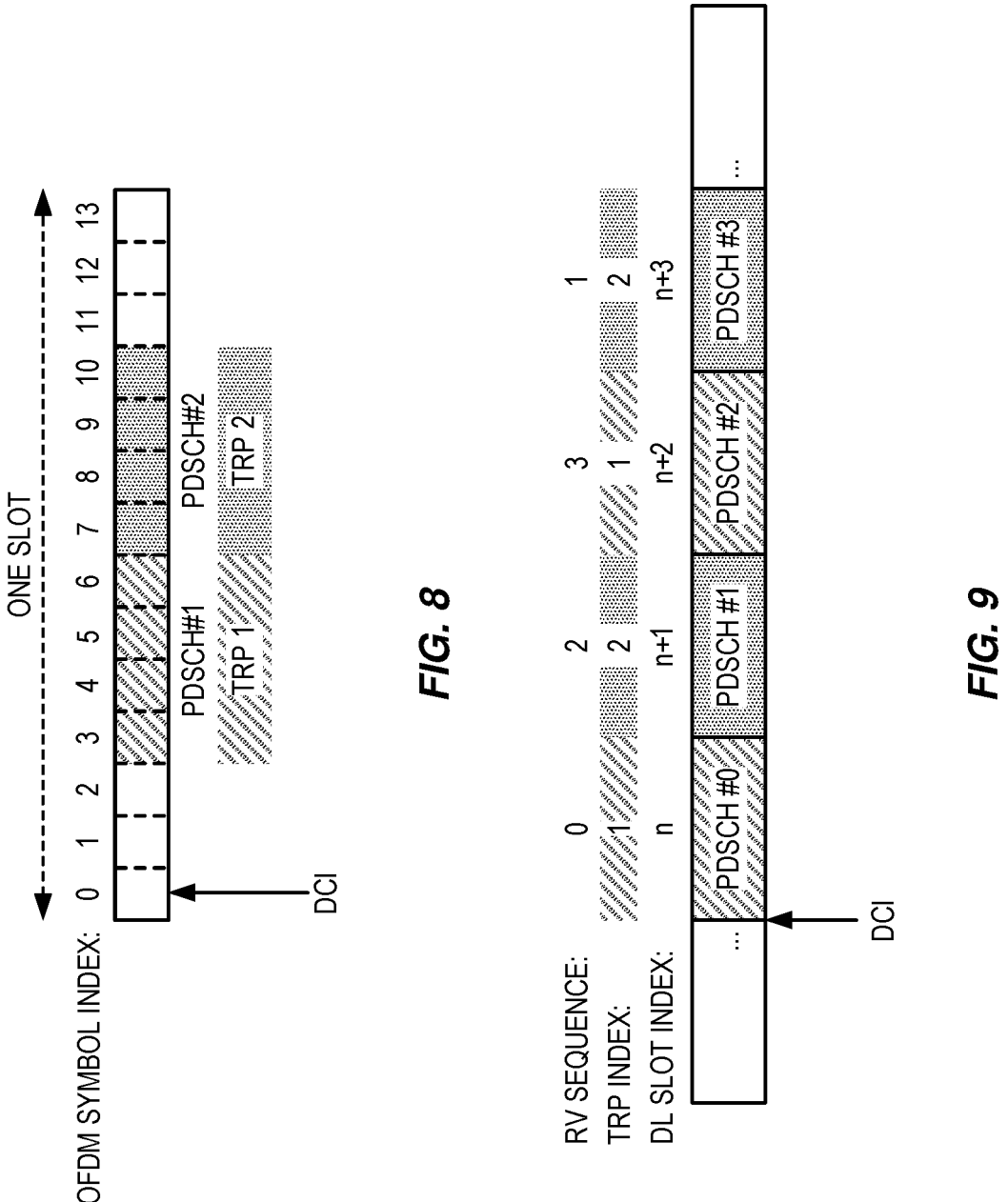
FIG. 8 illustrates an example data transmission with TDMSchemeA in which PDSCH repetition occurs in mini-slots of 4 Orthogonal Frequency Division Multiplexing (OFDM) symbols within a slot.
FIG. 9 illustrates an example multi-TRP data transmission with Slot based TDM scheme.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an Enhanced or Evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 10:
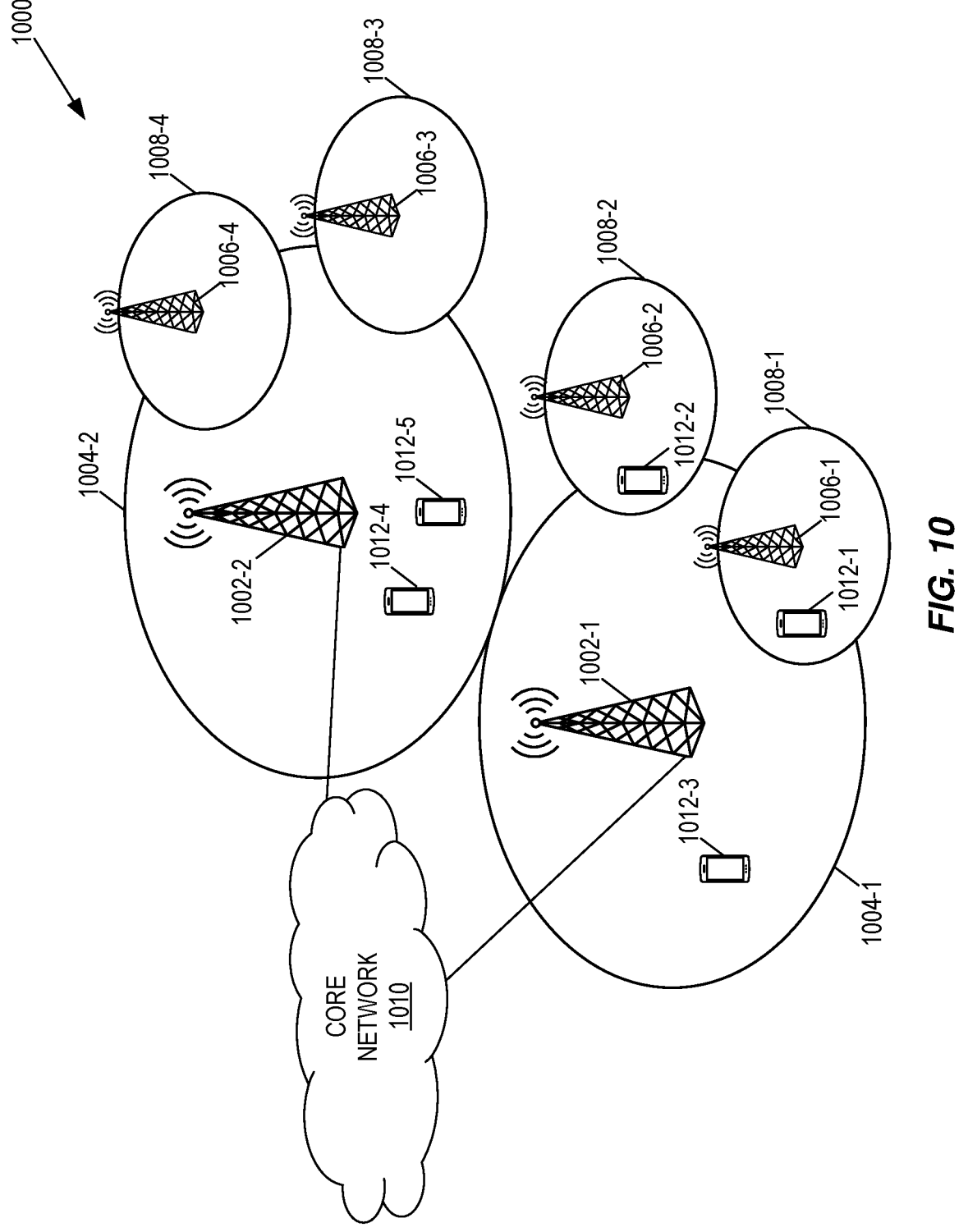
FIG. 10 illustrates one example of a cellular communications system in which embodiments of the present disclosure may be implemented.

FIG. 10 illustrates one example of a cellular communications system 1000 in which embodiments of the present disclosure may be implemented. In the embodiments described herein, the cellular communications system 1000 is a 5G system (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC). In this example, the RAN includes base stations 1002-1 and 1002-2, which in the 5GS include NR Base Stations (gNBs) and optionally Next Generation eNBs (ng-eNBs) (e.g., LTE RAN nodes connected to the 5GC) and in the EPS include eNBs, controlling corresponding (macro) cells 1004-1 and 1004-2. The base stations 1002-1 and 1002-2 are generally referred to herein collectively as base stations 1002 and individually as base station 1002. Likewise, the (macro) cells 1004-1 and 1004-2 are generally referred to herein collectively as (macro) cells 1004 and individually as (macro) cell 1004. The RAN may also include a number of low power nodes 1006-1 through 1006-4 controlling corresponding small cells 1008-1 through 1008-4. The low power nodes 1006-1 through 1006-4 can be small base stations (such as pico or femto base stations) or Remote Radio Heads (RRHs), or the like. Notably, while not illustrated, one or more of the small cells 1008-1 through 1008-4 may alternatively be provided by the base stations 1002. The low power nodes 1006-1 through 1006-4 are generally referred to herein collectively as low power nodes 1006 and individually as low power node 1006. Likewise, the small cells 1008-1 through 1008-4 are generally referred to herein collectively as small cells 1008 and individually as small cell 1008. The cellular communications system 1000 also includes a core network 1010, which in the 5GS is referred to as the 5GC. The base stations 1002 (and optionally the low power nodes 1006) are connected to the core network 1010.

The base stations 1002 and the low power nodes 1006 provide service to wireless communication devices 1012-1 through 1012-5 in the corresponding cells 1004 and 1008. The wireless communication devices 1012-1 through 1012-5 are generally referred to herein collectively as wireless communication devices 1012 and individually as wireless communication device 1012. In the following description, the wireless communication devices 1012 are oftentimes UEs, but the present disclosure is not limited thereto.

Systems and methods described herein provide for allowing Channel State Information (CSI) computation with ultra-low latency enabling such CSI computation to be used for more Ultra-Reliable Low-Latency Communication (URLLC) use cases.

In one embodiment, the UE is configured to apply relaxed/modified conditions for the ultra-low latency CSI timing requirement of Table 2 where the modified/relaxed conditions include allowing the ultra-low latency CSI timing requirement to be applied to a CSI report when a number of CSI Processing Units (CPUs) are occupied L is within a non-zero upper limit an aperiodically triggered CSI report is triggered to be transmitted on a Physical Uplink Shared Channel (PUSCH) that also carries Uplink Shared Channel (UL-SCH) data (e.g., a Transport Block (TB)) and/or Hybrid Automated Repeat Request-Acknowledgment (HARQ-ACK)

at most $C_0$ CSI Reference Signal (CSI-RS) ports are used in the CSI-RS resource used for channel measurement where $C_0$ is larger than 4 CSI-RS ports larger than on CSI-RS resource is used for channel measurement In another embodiment, a solution is proposed involving reserving a dedicated number of CPUs $N'_{CPU}$ that are only to be used specifically for ultra-low latency reports.

In another embodiment, a solution is proposed that involves defining a new latency class where the $(Z_1,Z'_1)$ values associated with the new latency class may be fixed in specifications, configurable via higher layers, or be determined based on UE capability reports.

Some embodiments related to relaxing conditions for low latency CSI reporting are as follows. In one embodiment, the conditions for applying the ultra-low latency CSI timing requirement of Table 2 (i.e., CSI computation delay requirement 1 in Table 5.4-1 of 3GPP Technical Specification (TS) 38.214) are relaxed/modified when a UE is configured by higher layers to apply the ultra-low latency CSI timing requirement. The relaxed/modified conditions may include one or more of the following:

a) The ultra-low latency CSI timing requirement can be applied to a CSI report associated with a CSI-Report-Config when a number L of CSI Processing Units (CPUs) which are occupied is within an upper limit (i.e., $L \leq L_0$ where $L_0$ is an integer larger than 0). In some embodiments, the upper limit $L_0$ may be higher layer configured to the UE (e.g., via Radio Resource Control (RRC) configuration). In further embodiments, the upper limit $L_0$ may also be a UE capability that the UE reports to the gNB. This modified condition allows the UE to simultaneously compute a CSI report requiring ultra-low latency while some CPUs (i.e., up to $L_0$ CPUs) are occupied for some other purpose (for instance, for calculating another CSI report).

b) The ultra-low latency CSI timing requirement can be applied to an aperiodically triggered CSI report when this CSI report is triggered to be transmitted on a Physical Uplink Shared Channel (PUSCH) that also carries Uplink Shared Channel (UL-SCH) data (e.g., a TB) and/or HARQ-ACK. In URLLC scenarios, the transmission of UL-SCH data and/or HARQ-ACK may be time critical as well. Hence, with this modified condition, the UE can compute CSI following ultra-low latency CSI timing requirement while at the same time being able to transmit UL-SCH data and/or HARQ-ACK in a timely manner.

c) The ultra-low latency CSI timing requirement can be applied to a CSI report with at most $C_0$ CSI-RS ports where $C_0$ is larger than 4 CSI-RS ports. In some embodiments, the upper limit $C_0$ for the number of CSI-RS ports may be higher layer configured to the UE (e.g., via RRC configuration). In further embodiments, the upper limit for the number of CSI-RS ports $C_0$ may also be a UE capability that the UE reports to the gNB. The beamforming gain attained using a larger number of CSI-RS ports (e.g., 8 or 16 CSI-RS ports) is beneficial for URLLC applications requiring higher reliability. Hence, with this modified condition, CSI reporting with a larger number of CSI-RS ports (i.e., larger than 4 ports) can be achieved while at the same time supporting ultra-low latency CSI timing requirement.

d) The ultra-low latency CSI timing requirement can be applied to a CSI report that is based on more than one Non-Zero Power (NZP) CSI-RS resource. Note that the reported CSI parameters in this case are based on joint channel measurements performed on the more than one NZP CSI-RS resource, and the more than one NZP CSI-RS resources used for channel measurement may be reported via more than one CSI-RS Resource Indicators (CRIs) as part of the CSI report. For multi-Transmission/Reception Point (TRP) URLLC schemes (e.g., FDMSchemeA, FDMSchemeB, TDMSchemeA, or Slot based TDM Scheme), the UE may need to calculate a joint CSI report while measuring the channels using two or more NZP CSI-RS resources corresponding to different Transmission Configuration Indicator (TCI) states (note the different TCI states here represent NZP CSI-RS reception from different TRPs). Hence, it is beneficial to allow the ultra-low latency CSI timing requirement for CSI reports that is based on two or more NZP CSI-RS resources. In some embodiments, the ultra-low latency CSI timing requirement can be applied to a CSI report that is based on at most $R_0$ NZP CSI-RS resources. In some cases, $R_0$ is fixed in 3GPP specifications (e.g., $R_0=2$). In some other cases, $R_0$ may be higher layer configured to the UE (e.g., via RRC configuration). In further embodiments, the upper limit $R_0$ may also be a UE capability that the UE reports to the gNB.

In another embodiment, the conditions for applying the low latency CSI timing requirement of Table 1 (i.e., CSI computation delay requirement 2 in Table 5.4-2 of 3GPP TS 38.214) are relaxed/modified when a UE is configured by higher layers to apply the modified conditions to apply the low latency CSI timing requirement. The modified conditions in this case may include one or more among conditions c) and d) listed above.

The relaxed conditions may be achieved with either increased UE CSI computation capability or reduced computation in some other areas for the same UE capability, or both.

In another embodiment, the number of occupied CPUs can also be relaxed such that not all CPUs need to be occupied when a CSI report requiring ultra-low latency CSI computation is processed by the UE. According to this embodiment, for CSI reports with higher layer parameter reportQuantity in CSI-ReportConfig set to 'cri-RI-PMI-CQI', 'cri-RI-i1', 'cri-RI-i1-CQI', 'cri-RI-CQI', or 'cri-RI-LI-PMI-CQI', $O_{CPU}=K_S$, where $K_S$ is the number of NZP CSI-RS resources in the CSI-RS resource set for channel measurement to be used in the CSI Report.

Some embodiments related to determining CSI reports requiring low latency are as follows. In some embodiments, it may be beneficial for the UE to know which CSI report requires ultra-low latency CSI timing requirement so that the UE can apply modified/relaxed conditions for choosing the CSI timeline only for these CSI reports. This can be achieved using one or a combination of multiple solutions given below.

In one solution, a higher layer parameter (or a flag) can be included in either the CSI-ReportConfig information element in 3GPP TS 38.331 or as part of another field within CSI-ReportConfig to indicate to the UE that the corresponding CSI report requires ultra-low latency. Alternatively, such a higher layer parameter or flag can be configured in the CSI-AssociatedReportConfigInfo field in 3GPP TS 38.331.

FIG. 11 illustrates an example of a CSI-AperiodicTriggerStateList information element with a higher layer flag configured in the CSI-AssociatedReportConfigInfo field according to embodiments described herein. In the example of FIG. 11, the flag is named 'applyCsiComputationDelayRequirement1'. This flag is optional, and when the flag is not configured in an CSI-AssociatedReportConfigInfo, then the CSI report associated with that CSI-AssociatedReportConfigInfo is assumed not to require ultra-low latency CSI computation.

In another solution, a CSI report can be identified to be requiring ultra-low latency CSI if the triggering offset $K_2$ between the last symbol of the Physical Downlink Control Channel (PDCCH) triggering the CSI report and the first symbol of the PUSCH carrying the CSI report is below a threshold. In some embodiments, the threshold value may be fixed in 3GPP specifications. In another embodiment, the threshold value may be higher layer configured to the UE.

In yet another solution, a CSI report can be identified to be requiring ultra-low latency CSI if the cqi-Table field in the CSI-ReportConfig information element is set to a particular value. For instance, if the cqi-Table is set to value 'table3' in a CSI-ReportConfig, the CSI report corresponding to this CSI-ReportConfig can be interpreted by the UE as a CSI report that requires ultra-low latency.

In another embodiment, the latency requirement is indicated by $K_2$ in Downlink Control Information (DCI) carrying the CSI request while the CSI report configuration needs to satisfy certain conditions such as the ones discussed above with respect to relaxing conditions for low latency CSI reporting.

In another embodiment, the Aperiodic CSI (A-CSI) triggered by DCI can be categorized as ultra-low latency CSI or not, depending on other signals and data that may or may not be multiplexed onto the same PUSCH.

In one example, if the A-CSI is triggered by the DCI to be carried by a PUSCH without presence of payload data (i.e., no TB for the PUSCH), then the A-CSI computation can tolerate more computation delay. In order to tolerate longer CSI computation delay, the requirement of in-order PUSCH transmission should be removed for the case of PUSCH without payload data.

On the other hand, if the A-CSI triggered by DCI is to be multiplexed onto the PUSCH with presence of payload data (i.e., with a TB on the same PUSCH), then the A-CSI computation should satisfy low latency requirement. The parameter settings for the lower latency CSI computation and reporting can be configured by higher layer, together with the DCI signaling (e.g., $K_2$ signaled by DCI).

This is due to the consideration of in-order transmission of PUSCH. In other words, since out-of-order PUSCH transmission is not allowed, then a PUSCH carrying A-CSI would prevent the scheduler from scheduling subsequent PUSCH transmission with low delay, if the A-CSI computation causes long delay in its associated PUSCH. For reference, "no out-of-order PUSCH" requirement is specified in Rel-15 as: "For any two HARQ process IDs in a given scheduled cell, if the UE is scheduled to start a first PUSCH transmission starting in symbol j by a PDCCH ending in symbol i, the UE is not expected to be scheduled to transmit a PUSCH starting earlier than the end of the first PUSCH by a PDCCH that ends later than symbol i."

Some embodiments related to a UE indicating dedicated low latency CSI computation capability are as follows. In this embodiment, a UE supports a dedicated number of CPUs $N'_{CPU}$ that are only to be used specifically for ultra-low latency reports (i.e., CSI reports for ultra-low latency). As part of UE capability, the UE will report the number of dedicated CPUs $N'_{CPU}$ it can support. In some embodiments, the dedicated $N'_{CPU}$ CPUs are not to be used for computing CSI reports that are not for ultra-low latency CSI reports. The ultra-low latency CSI reports may be identified by the UE via the solutions proposed above with respect to determining CSI reports requiring low latency. Each CSI report is associated with a CSI-ReportConfig.

FIG. 12 illustrates an example of Multiple-Input Multiple-Output (MIMO) capability parameter reporting according to embodiments described herein. An example UE capability parameter for such dedicated number of CPUs per Configured Cell (CC) can be reported as part of MIMO capability parameters.

In the example of FIG. 12, the upper bound for the simultanousUltraLowLatencyCSI-ReportsPerCC parameter X can be an integer (e.g., a value between 1 and 8). Note that this parameter is different from the parameter simultaneous-CSI-ReportsPerCC which is used to define the number of CPUs $N_{CPU}$ which is currently defined in NR.

In the example of FIG. 12, the parameter simultaneousUltraLowLatencyCSI-ReportsPerCC can be defined as follows:

"simultaneousUltraLowLatencyCSI-ReportsPerCC indicates the number of CSI report(s) associated with ultra-low latency class for which the UE can measure and process reference signals simultaneously in a CC of the band for which this capability is provided. The CSI report comprises periodic, semi-persistent and A-CSI."

FIG. 13 illustrates another example of MIMO capability parameter reporting according to embodiments described herein. In an alternative embodiment, the range of the existing simultaneousCSI-ReportsPerCC capability parameter reported by the UE can be extended beyond 8. For instance, the extension can be specified as in FIG. 13 where the value X can be larger than 8 (e.g., X=16).

In another embodiment, the number of CPUs can be partitioned so that one part of the CPUs is dedicated and used for CSI reports that require ultra-low latency. For instance, if the UE supports 16 CPUs, then 8 CPUs can be dedicated for CSI reports that require ultra-low latency. The remaining 8 CPUs can be used for other purposes (e.g., for computing CSI reports that do not require ultra-low latency).

In some embodiments, the simultaneousUltraLowLatencyCSI-ReportsPerCC are dedicated to CSI reports that require ultra-low latency CSI computation. The CSI reports that require ultra-low latency may be explicitly configured in the CSI-ReportConfig. The dedicated number $N'_{CPU}$ of CPUs are only used for such CSI reports needing ultra-low latency CSI computation.

In some embodiments, the dedicated number of CPUs $N'_{CPU}$ is then given by the number of ultra-low latency CSI reports a UE can process across all configured cells, which is determined using the reported simultaneousUltraLowLatencyCSI-ReportsPerCC and the number of CCs.

With this embodiment, the UE can process a CSI requiring ultra-low latency CSI timing requirement in Table 2 (i.e., CSI computation delay requirement 1 in Table 5.4-1 of 3GPP TS 38.214) even when L>0 regular CPUs are occupied for other CSI computations. That is, the dedicated number of CPUs $N'_{CPU}$ which are reserved for ultra-low latency CSI computation can always be used to compute the ultra-low latency CSI even when part or whole of the non-dedicated number of CPUs $N_{CPU}$ are used for other CSI computations.

In one embodiment, the UE can only process a single ultra-low latency CSI report at a time. The single ultra-low latency CSI report limit may be defined per a component carrier or across all configured component carriers.

In another embodiment, the UE can process a fixed number of ultra-low latency CSIs report at a time. The fixed number of ultra-low latency CSI reports larger than 1 may be specified in 3GPP specifications. Alternatively, the fixed number of ultra-low latency CSI report limit may be per a component carrier or across all configured component carriers. It should be noted that the gNB may schedule URLLC traffic to the UE using either single TRP transmission or multi-TRP transmission. Hence, this embodiment is beneficial since it allows simultaneous triggering of multiple ultra-low latency CSI reports.

In another embodiment, the UE can process multiple ultra-low latency CSI reports according to the following rule:

If L' dedicated CPUs are occupied for calculation of ultra-low latency CSI reports in a given Orthogonal Frequency Division Multiplexing (OFDM) symbol, the UE has $N'_{CPU}-L'$ unoccupied dedicated CPUs for ultra-low latency CSI computation. If N' ultra-low latency CSI reports start occupying their respective dedicated CPUs on the same OFDM symbol on which $N'_{CPU}-L'$ dedicated CPUs are unoccupied, where each ultra-low latency CSI report n'=0, . . . , N'−1 corresponds to $O'_{CPU}^{(n')}$ occupied dedicated CPUs, the UE is not required to update the N'−M' requested ultra-low latency CSI reports with lowest priority, where $0 \leq M' \leq N'$ is the largest value such that $\sum_{n'=0}^{M'-1} O'_{CPU}{}^{(n')} \leq N'_{CPU} - L'$ holds.

In an alternative embodiment, when the $N'_{CPU}$ are not utilized for CSI reports requiring ultra-low latency, the $N'_{CPU}$ CPUs may be used for other type of CSIs (not requiring ultra-low latency) or beam reports. But when a UE needs to compute an urgent CSI needing ultra-low latency, the other CSI reports that are being computed on the whole or subset of $N'_{CPU}$ are dropped and the UE starts processing the urgent ultra-low latency CSI using the $N'_{CPU}$ dedicated CPUs.

Similarly, dedicated CPUs can be defined for handling multiplexing of CSI reports with UL-SCH TBs or HARQ-ACK or both. In this case, ultra-low latency CSI timeline can be applied also in the case when transmitting a PUSCH with either TB or HARQ-ACK or both.

Recall that in existing NR specifications, when more than one CSI report is aperiodically triggered by a PDCCH, then the largest $(Z,Z')$ values across different CSI reports aperiodically triggered are used for all the CSI reports. This is restrictive in case a first CSI report requiring ultra-low latency CSI is triggered with a second CSI report that does not require low latency CSI by the same PDCCH. In this case, the largest $(Z,Z')$ values will correspond the second CSI report and these largest $(Z,Z')$ values will also be applied to the first CSI report which may result in a stale CSI being reported for the first CSI report.

To alleviate this restriction, in another embodiment the following modifications/relaxations are proposed:

If one or more CSI reports requiring ultra-low latency CSI is aperiodically triggered by a PDCCH, then then the $(Z,Z')$ values for these one or more CSI reports are determined according to an ultra-low latency CSI timing requirement (e.g., the ultra-low latency CSI timing requirement in Table 2 or the new ultra-low latency CSI timing requirement proposed below with respect to defining a new low latency class for CSI reporting).

If more than one CSI report setting not requiring ultra-low latency CSI is aperiodically triggered by a PDCCH, then the largest $(Z,Z')$ values across these different reports aperiodically triggered are used for all the aperiodically triggered CSI reports.

If a first CSI report requiring ultra-low latency CSI and a second CSI report not requiring ultra-low latency CSI are aperiodically triggered by a PDCCH, then the $(Z,Z')$ values for the first CSI report are determined according to an ultra-low latency CSI timing requirement (e.g., the ultra-low latency CSI timing requirement in Table 2 or the new ultra-low latency CSI timing requirement proposed below with respect to defining a new low latency class for CSI reporting), and the $(Z,Z')$ value for the second CSI report is determined according to its associated CSI timing requirement (i.e., either a low-latency or high-latency CSI timing requirement given in Table 1).

Some embodiments related to defining a new low latency class for CSI reporting are as follows. In another embodiment, a new latency class (or a new CSI computation delay requirement) may be defined for certain use cases such as calculating fast CSI for multi-TRP URLLC. The new latency class may be captured in a new table in 3GPP specifications (i.e., the table is different from Tables 5.4-1 and 5.4-2 of TS 38.214), and the $Z_1$ and $Z'_1$ requirements for the newly defined latency class are between the $(Z_1,Z'_1)$ values corresponding to the ultra-low latency class (i.e., in Table 5 5.4-1 of TS 38.214) and the low latency class (i.e., 5.4-2 of TS 38.214). For instance, the $Z_1$ value corresponding to 15 kilohertz (kHz) Subcarrier Spacing (SCS) (corresponding to $\mu=0$) is a value between 10 symbols (corresponding to $Z_1$ value in Table 5.4-1 of TS 38.214) and 22 symbols (corresponding to $Z_1$ value in Table 5.4-2 of TS 38.214). Other $Z_1$ and $Z'_1$ requirement values in the new latency class may be defined similarly. The new latency class may be applied based on one or more of the conditions described above with respect to relaxing conditions for low latency CSI reporting.

In some embodiments, the $(Z_1,Z'_1)$ values associated with the new latency class may be fixed and defined in 3GPP specifications. In another embodiment, the $(Z_1,Z'_1)$ values associated with the new latency class may be either higher layer configurable (e.g., via RRC configuration) or may depend on UE capability reporting. An example is shown in Table 3. In the example of Table 3, the delay requirement values $(Y_1, Y_2, Y_3, Y_4)$ and $(Y'_1, Y'_2, Y'_3, Y'_4)$ may be either higher layer configurable or may depend on UE capability reporting.

One benefit of this embodiment is that a more capable UE can indicate via UE capability reporting that it is able to follow the new latency class and compute CSI following the CSI computation delay requirement of this new latency class.

TABLE 3

A example of a newly defined Ultra-low latency CSI timing requirement with configurable $(Z_1, Z'_1)$ values

| μ | $Z_1$ [symbols] | |
|---|---|---|
| | $Z_1$ | $Z'_1$ |
| 0 | $Y_1$ | $Y'_1$ |
| 1 | $Y_2$ | $Y'_2$ |
| 2 | $Y_3$ | $Y'_3$ |
| 3 | $Y_4$ | $Y'_4$ |

This new latency class may be used together with relaxed conditions such as those discussed above with respect to relaxing conditions for low latency CSI reporting in order to improve CSI report latency over the existing ones specified in Table 5.4-2 of 3GPP TS 38.214.

In yet another embodiment, different CSI timing requirements can be defined for a CSI report configured for the purpose of deriving CSI for one of the multi-TRP URLLC schemes (e.g., FDMSchemeA, FDMSchemeB, TDMSchemeA, or Slot based TDM Scheme) when compared to a CSI report that is not configured for one of the multi-TRP URLLC schemes. That is, a first CSI timing requirement is applicable when the CSI report is configured for one of the multi-TRP URLLC schemes while a second timing CSI requirement is applicable when the CSI report is not configured for one of the multi-TRP URLLC schemes. The first CSI timing requirement can be a newly defined latency class (i.e., a new table similar to Table 3) and the second CSI timing requirement can be either the existing low latency CSI requirement (e.g., ultra-low latency class in Table 5.4-1 of 3GPP TS 38.214 or the low latency class in Table 5.4-2 of TS 38.214) or a second newly defined latency class (i.e., similar to the one described above with respect to defining a new low latency class for CSI reporting).

Some embodiments related to CSI computation delay requirement with dependency on Timing Advance (TA) value are as follows. In this embodiment, the CSI computation delay requirement has dependency on the TA the UE experiences. The TA amount is labeled as $N_{TA}$.

In one example, the UE experiencing long TA (e.g., $N_{TA} \geq N_{TA,threshold}$) uses one set of CSI delay requirement(s) #A, whereas the UE experiencing short TA (e.g., $N_{TA} < N_{TA,threshold}$) uses another set of CSI delay requirement(s) #B. For a given condition (e.g., CSI report configuration, SCS, etc.), CSI delay requirement #B is reduced compared with CSI delay requirement #A. This is useful for small cell deployment where the TA is very small, and small cell deployment is the use case for many URLLC system, for example, factory automation. In this example, it assumes that the CSI report timing is specified to include the effect of TA.

In another example, the CSI computation delay requirement (Z and Z') is specified in a way such that the effect of TA is treated separately. For instance, the CSI report delay requirement can be specified as:

"When the CSI request field on a DCI triggers a CSI report(s) on PUSCH, the UE shall provide a valid CSI report for the n-th triggered report,
if the first Uplink (UL) symbol to carry the corresponding CSI report(s) excluding the effect of the timing advance, starts no earlier than at symbol $Z_{ref}$, and
if the first UL symbol to carry the n-th CSI report excluding the effect of the timing advance, starts no earlier than at symbol $Z'_{ref(n)}$, . . . "

Another way to specify the CSI computation delay requirement (Z and Z') separately from the effect of TA is specify that the CSI computation delay requirement is under the assumption that TA is equal to 0.

In another example, the timing is defined according to Downlink (DL) signal reception time. This includes: reception time of PDCCH that triggers the CSI report; reception time of CSI-RS that is used to perform channel measurement. Below is an example to illustrate this, using the 3GPP TS 38.214 v16.2.0 text as a basis:

"When the CSI request field on a DCI triggers a CSI report(s) on PUSCH, the UE shall provide a valid CSI report for the n-th triggered report,
if the first UL symbol to carry the corresponding CSI report(s), starts no earlier than at symbol $Z_{ref}$, and
if the first UL symbol to carry the n-th CSI report, starts no earlier than at symbol $Z'_{ref(n)}$,
where $Z_{ref}$ is defined as the next UL symbol with its CP starting $T_{proc,CSI} = (Z)(2048+144) \cdot \kappa 2^{-\mu} \cdot T_C + T_{switch}$ after the end of the last symbol of the PDCCH reception where the PDCCH triggers the CSI report(s), and where $Z'_{ref(n)}$ is defined as the next UL symbol with its CP starting $T'_{proc,CSI} = (Z')(2048+144) \cdot \kappa 2^{-\mu} \cdot T_C$ after the end of the reception of the last symbol in time of the latest of: aperiodic CSI-RS resource for channel measurements, aperiodic CSI-IM used for interference measurements, and aperiodic NZP CSI-RS for interference measurement, when aperiodic CSI-RS is used for channel measurement for the n-th triggered CSI report, and where $T_{switch}$ is defined in clause 6.4 and is applied only if $Z_1$ of table 5.4-1 is applied."

As described earlier, if the TA effect is excluded (or treated separately), then the CSI computation delay requirement can be reduced accordingly. This allows faster CSI report from the UE to the gNB, and the gNB can then utilize the CSI report to make better scheduling decision for DL transmission.

FIG. 14 is a flowchart illustrating a method in accordance with particular embodiments. This method may be performed by a UE. Optional steps are indicated with dashed lines. The method begins at step 1400 with determining conditions to apply a first CSI computation delay requirement over a second CSI computation delay requirement according to one or more higher layer configured parameters. At step 1400, the method also includes sub-step 1402 with using a first set of conditions for determining if the first CSI computation delay requirement should be applied over the second CSI computation delay requirement when the UE is configured with the one or more higher layer configured parameters. At step 1400, the method also includes sub-step 1404 with using a second set of conditions for determining if the first CSI computation delay requirement should be applied over the second CSI computation delay requirement when the UE is not configured with the one or more higher layer configured parameters. The method optionally includes step 1406 with reporting the CSI to a network in accordance with determining the conditions to apply the first CSI computation delay requirement over the second CSI computation delay requirement.

FIG. 15 is a flowchart illustrating another method in accordance with particular embodiments. This method may be performed by a UE. The method begins at step 1500 with determining one or more conditions to apply a lower CSI computation delay requirement over a higher CSI computation delay requirement when computing CSI for a CSI report according to one or more higher layer configured parameters. The method also includes step 1502 with providing the CSI report to the network using the lower CSI computation delay requirement when at least one of the one or more conditions is met.

FIG. 16 is a flowchart illustrating another method in accordance with particular embodiments. This method may be performed by a network node. Optional steps are indicated with dashed lines. The method begins at step 1600 with configuring a UE such that under one or more conditions the UE applies a lower CSI computation delay requirement over a higher CSI computation delay requirement. The method may also include step 1602 with including a higher layer parameter or flag in a CSI report configuration message to indicate that a corresponding CSI report requires the lower CSI computation delay requirement.

Figure 17:
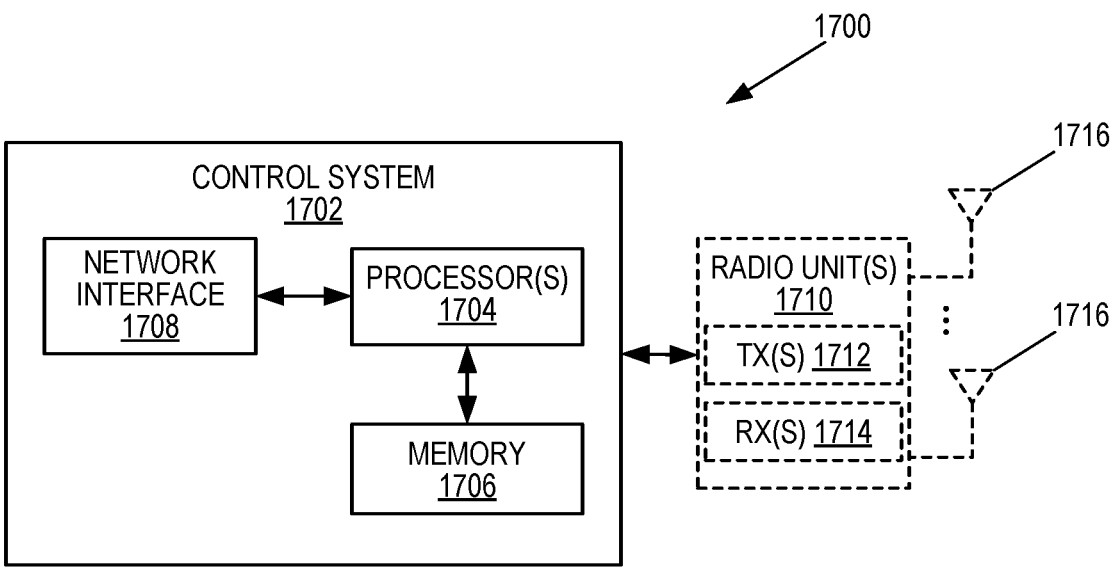
FIG. 17 is a schematic block diagram of a radio access node according to some embodiments of the present disclosure.

FIG. 17 is a schematic block diagram of a network node 1700 according to some embodiments of the present disclosure. Optional features are represented by dashed boxes. The network node 1700 may be, for example, a radio access node, such as a base station 1002 or 1006 or a network node that implements all or part of the functionality of the base station 1002 or gNB described herein. As illustrated, the network node 1700 includes a control system 1702 that includes one or more processors 1704 (e.g., central processing units, Application Specific Integrated Circuits (ASICs), Field Programmable Gate Arrays (FPGAs), and/or the like), memory 1706, and a network interface 1708. The one or more processors 1704 are also referred to herein as processing circuitry. In addition, the network node 1700 may include one or more radio units 1710 that each includes one or more transmitters 1712 and one or more receivers 1714 coupled to one or more antennas 1716. The radio units 1710 may be referred to or be part of radio interface circuitry. In some embodiments, the radio unit(s) 1710 is external to the control system 1702 and connected to the control system 1702 via, e.g., a wired connection (e.g., an optical cable). However, in some other embodiments, the radio unit(s) 1710 and potentially the antenna(s) 1716 are integrated together with the control system 1702. The one or more processors 1704 operate to provide one or more functions of a network node 1700 as described herein. In some embodiments, the function(s) are implemented in software that is stored, e.g., in the memory 1706 and executed by the one or more processors 1704.

Figure 18:
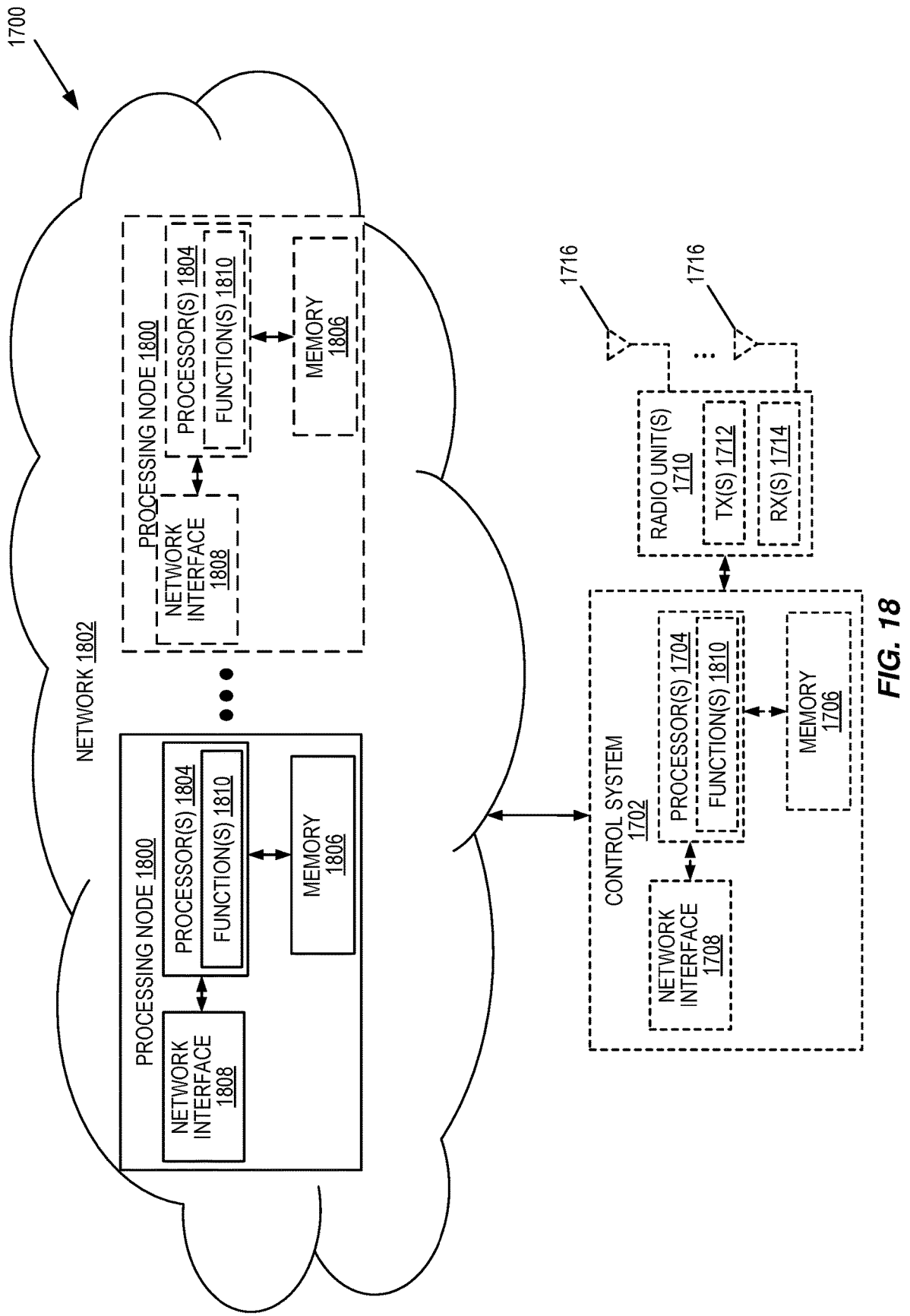
FIG. 18 is a schematic block diagram that illustrates a virtualized embodiment of the radio access node according to some embodiments of the present disclosure.

FIG. 18 is a schematic block diagram that illustrates a virtualized embodiment of the network node 1700 according to some embodiments of the present disclosure. This discussion is equally applicable to other types of network nodes. Further, other types of network nodes may have similar virtualized architectures. Again, optional features are represented by dashed boxes.

As used herein, a "virtualized" network node is an implementation of the network node 1700 in which at least a portion of the functionality of the network node 1700 is implemented as a virtual component(s) (e.g., via a virtual machine(s) executing on a physical processing node(s) in a network(s)). As illustrated, in this example, the network node 1700 may include the control system 1702 and/or the one or more radio units 1710, as described above. The control system 1702 may be connected to the radio unit(s) 1710 via, for example, an optical cable or the like. The network node 1700 includes one or more processing nodes 1800 coupled to or included as part of a network(s) 1802. If present, the control system 1702 or the radio unit(s) 1710 are connected to the processing node(s) 1800 via the network 1802. Each processing node 1800 includes one or more processors 1804 (e.g., central processing units, ASICs, FPGAs, and/or the like), memory 1806, and a network interface 1808.

In this example, functions 1810 of the network node 1700 described herein are implemented at the one or more processing nodes 1800 or distributed across the one or more processing nodes 1800 and the control system 1702 and/or the radio unit(s) 1710 in any desired manner. In some particular embodiments, some or all of the functions 1810 of the network node 1700 described herein are implemented as virtual components executed by one or more virtual machines implemented in a virtual environment(s) hosted by the processing node(s) 1800. As will be appreciated by one of ordinary skill in the art, additional signaling or communication between the processing node(s) 1800 and the control system 1702 is used in order to carry out at least some of the desired functions 1810. Notably, in some embodiments, the control system 1702 may not be included, in which case the radio unit(s) 1710 communicate directly with the processing node(s) 1800 via an appropriate network interface(s).

In some embodiments, a computer program including instructions which, when executed by at least one processor, causes the at least one processor to carry out the functionality of network node 1700 or a node (e.g., a processing node 1800) implementing one or more of the functions 1810 of the network node 1700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 19:
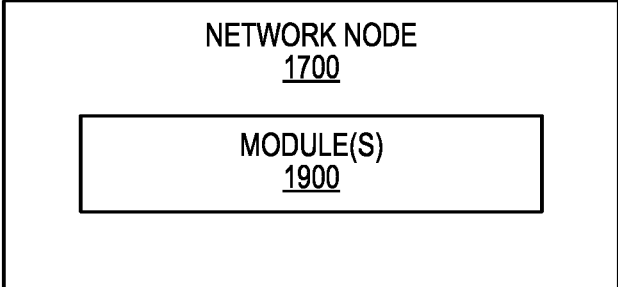
FIG. 19 is a schematic block diagram of the radio access node according to some other embodiments of the present disclosure.

FIG. 19 is a schematic block diagram of the network node 1700 according to some other embodiments of the present disclosure. The network node 1700 includes one or more modules 1900, each of which is implemented in software. The module(s) 1900 provide the functionality of the network node 1700 described herein. This discussion is equally applicable to the processing node 1800 of FIG. 18 where the modules 1900 may be implemented at one of the processing nodes 1800 or distributed across multiple processing nodes 1800 and/or distributed across the processing node(s) 1800 and the control system 1702.

Figure 20:
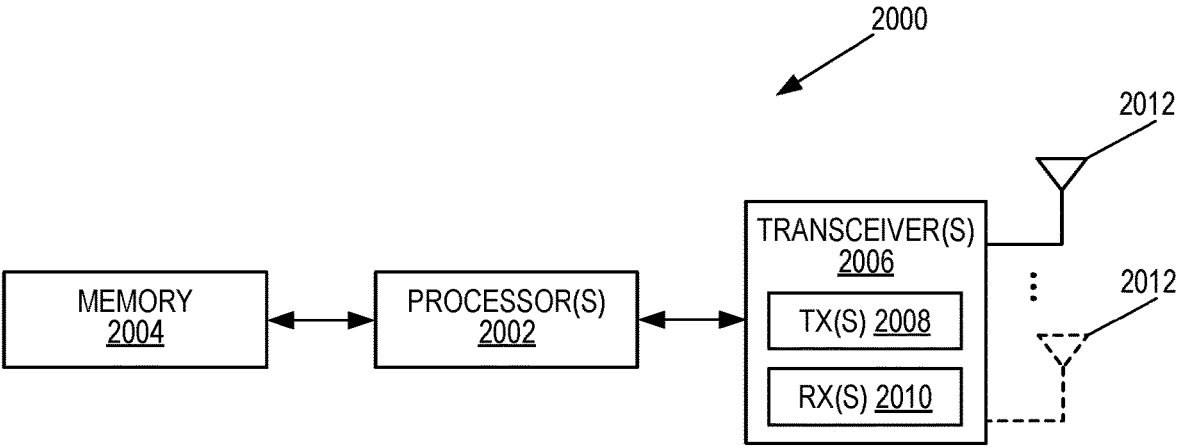
FIG. 20 is a schematic block diagram of a wireless communication device according to some embodiments of the present disclosure.

FIG. 20 is a schematic block diagram of a wireless communication device 2000 according to some embodiments of the present disclosure. As illustrated, the wireless communication device 2000 includes one or more processors 2002 (e.g., central processing units, ASICs, FPGAs, and/or the like), memory 2004, and one or more transceivers 2006 each including one or more transmitters 2008 and one or more receivers 2010 coupled to one or more antennas 2012. The transceiver(s) 2006 includes radio-front end circuitry connected to the antenna(s) 2012 that is configured to condition signals communicated between the antenna(s) 2012 and the processor(s) 2002, as will be appreciated by on of ordinary skill in the art. The processors 2002 are also referred to herein as processing circuitry. The transceivers 2006 are also referred to herein as radio circuitry. In some embodiments, the functionality of the wireless communication device 2000 described above may be fully or partially implemented in software that is, e.g., stored in the memory 2004 and executed by the processor(s) 2002. Note that the wireless communication device 2000 may include additional components not illustrated in FIG. 20 such as, e.g., one or more user interface components (e.g., an input/output interface including a display, buttons, a touch screen, a microphone, a speaker(s), and/or the like and/or any other components for allowing input of information into the wireless communication device 2000 and/or allowing output of information from the wireless communication device 2000), a power supply (e.g., a battery and associated power circuitry), etc.

In some embodiments, a computer program including instructions which, when executed by at least one processor, causes the at least one processor to carry out the functionality of the wireless communication device 2000 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 21:
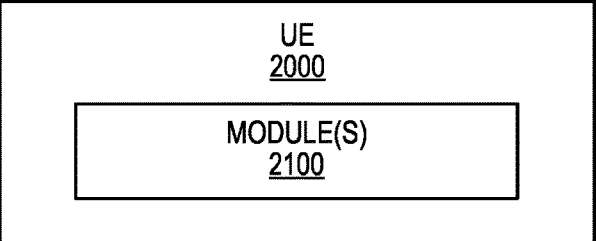
FIG. 21 is a schematic block diagram of the wireless communication device according to some other embodiments of the present disclosure.

FIG. 21 is a schematic block diagram of the wireless communication device 2000 according to some other embodiments of the present disclosure. The wireless communication device 2000 includes one or more modules 2100, each of which is implemented in software. The module(s) 2100 provide the functionality of the wireless communication device 2000 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Embodiments

Embodiment 1: A method of CSI reporting by a UE to a network, wherein conditions to apply a first CSI computation delay requirement over a second CSI computation delay requirement are determined according to one or more higher layer configured parameters and wherein: a first set of conditions are used by the UE for determining if the first CSI computation delay requirement should be applied over the second CSI computation delay requirement when the UE is configured with the one or more higher layer configured parameters; and a second set of conditions are used by the UE for determining if the first CSI computation delay requirement should be applied over the second CSI computation delay requirement when the UE is not configured with the one or more higher layer configured parameters.

Embodiment 2: The method of embodiment 1, wherein the first set of conditions includes one or more of the following: when a number L of processors are occupied at the time when the CSI needs to be processed is within an upper limit (i.e., $L \leq L_0$ where $L_0$ is an integer larger than 0); when a CSI report is triggered to be transmitted on a PUSCH that also carries UL-SCH data (e.g., a TB) and/or a HARQ-ACK; when at most $C_0$ CSI-RS ports are used in a NZP CSI-RS for channel measurement associated with the CSI report where $C_0$ is larger than 4 CSI-RS ports; and/or when more than one NZP CSI-RS resource is used for channel measurement associated with the CSI report.

Embodiment 3: The method of embodiment 1, wherein the second set of conditions include one or more of the following: when a number L of CPUs are occupied at the time when the CSI needs to be processed is zero; when a CSI report is triggered to be transmitted on a PUSCH that does not carry UL-SCH data (e.g., a TB) and/or a HARQ-ACK; when at most 4 CSI-RS ports are used in a NZP CSI-RS for channel measurement associated with the CSI report; and/or when a single NZP CSI-RS resource is used for channel measurement associated with the CSI report.

Embodiment 4: A method performed by a UE for reporting CSI, the method comprising: determining conditions to apply a first CSI computation delay requirement over a second CSI computation delay requirement according to one or more higher layer configured parameters, by: using a first set of conditions for determining if the first CSI computation delay requirement should be applied over the second CSI computation delay requirement when the UE is configured with the one or more higher layer configured parameters; and using a second set of conditions for determining if the first CSI computation delay requirement should be applied over the second CSI computation delay requirement when the UE is not configured with the one or more higher layer configured parameters; and reporting the CSI to a network in accordance with determining the conditions to apply the first CSI computation delay requirement over the second CSI computation delay requirement.

Embodiment 5: A UE for reporting CSI, the UE comprising: processing circuitry configured to perform any of the steps of embodiments 1 to 4; and power supply circuitry configured to supply power to the UE.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
16 QAM 16-bit Quadrature Amplitude Modulation
A-CSI Aperiodic Channel State Information
AMF Access and Mobility Management Function
ASIC Application Specific Integrated Circuit
AUSF Authentication Server Function
BWP Band Width Part
CC Configured Cell
CDM Code Division Multiplexing
CE Control Element
CoMP Coordinated Multi-Point
CP-OFDM Cyclic Prefix Orthogonal Frequency Division Multiplexing
CPU Channel State Information Processing Unit
CQI Channel Quality Indicator
CRI Channel State Information Reference Signal Resource Indicator
CSI Channel State Information
CSI-IM Channel State Information Interference Measurement
CSI-RS Channel State Information Reference Signal
CW Codeword
DCI Downlink Control Information
DFT Discrete Fourier Transform
DL Downlink
DMRS Demodulation Reference Signal
DSP Digital Signal Processor
eMBB Enhanced Mobile Broadband
eNB Enhanced or Evolved Node B
EPC Evolved Packet Core
EPS Evolved Packet System
E-UTRAN Evolved Universal Terrestrial Radio Access Network
FPGA Field Programmable Gate Array
FR1 Frequency Range 1
FR2 Frequency Range 2
gNB New Radio Base Station
gNB-CU New Radio Base Station Central Unit
gNB-DU New Radio Base Station Distributed Unit
HARQ-ACK Hybrid Automated Repeat Request-Acknowledgment
HSS Home Subscriber Server
ID Identifier
IMR Interference Measurement Resource
IoT Internet of Things
LI Layer Indicator
LTE Long Term Evolution
MAC Media Access Control
MCS Modulation and Coding Scheme
MIMO Multiple-Input Multiple-Output
MME Mobility Management Entity
MTC Machine Type Communication
NC-JT Non-Coherent Joint Transmission
NEF Network Exposure Function
NF Network Function ng-eNB Next Generation Enhanced or Evolved Node B
NR New Radio
NRF Network Function Repository Function
NSSF Network Slice Selection Function
NZP Non-Zero Power
OFDM Orthogonal Frequency Division Multiplexing
PC Personal Computer
PCF Policy Control Function
P-CSI Periodic Channel State Information
PDCCH Physical Downlink Control Channel
PDSCH Physical Downlink Shared Channel
P-GW Packet Data Network Gateway
PMI Precoder Matrix Indicator
PRB Physical Resource Block
PRG Precoding Resource Block Group
PUSCH Physical Uplink Shared Channel
PUCCH Physical Uplink Control Channel
QCL Quasi Co-Located
QPSK Quadrature Phase Shift Keying
RAM Random Access Memory
RAN Radio Access Network
RB Resource Block
RE Resource Element
RI Rank Indicator
ROM Read Only Memory
RRC Radio Resource Control
RRH Remote Radio Head
RV Redundancy Version
SCEF Service Capability Exposure Function
SCS Subcarrier Spacing
SINR Signal-to-Interference-Plus-Noise Ratio
SMF Session Management Function
TA Timing Advance
TB Transport Block
TCI Transmission Configuration Indicator
TRP Transmission/Reception Point or Panel
TRS Tracking Reference Signal
TS Technical Specification
UCI Uplink Control Information
UDM Unified Data Management
UE User Equipment
UL Uplink
UL-SCH Uplink Shared Channel
UPF User Plane Function
URLLC Ultra-Reliable Low-Latency Communication Those skilled in the art will recognize improvements and modifications to the embodiments of the present disclosure. All such improvements and modifications are considered within the scope of the concepts disclosed herein.

The invention claimed is:

1. A method performed by a User Equipment, UE, of reporting Channel State Information, CSI, to a network, the method comprising:
   determining one or more conditions to apply a lower CSI computation delay requirement instead of a higher CSI computation delay requirement when computing CSI for a CSI report, wherein the one or more conditions are determined according to one or more higher layer configured parameters; and
   providing the CSI report to the network using the lower CSI computation delay requirement when at least one of the one or more conditions is met,
   wherein the lower CSI computation delay requirement is an ultra-low latency CSI computation delay.

2. The method of claim 1, wherein the one or more conditions comprise a number L of CSI Processing Units, CPUs, occupied when the CSI report is triggered being within an upper limit $L_0$, where $L_0$ is an integer greater than 0.

3. The method of claim 2, wherein the upper limit $L_0$ is higher layer configured to the UE by the network.

4. The method of claim 2, wherein the upper limit $L_0$ is a UE capability reported by the UE to the network.

5. The method of claims 1, wherein the one or more conditions comprise the CSI report being aperiodically triggered to be transmitted on a Physical Uplink Shared Channel, PUSCH, that also carries Uplink Shared Channel, UL-SCH, data, a Hybrid Automated Repeat Request-Acknowledgment, HARQ-ACK, or both the UL-SCH data and the HARQ-ACK.

6. The method of claims 1, wherein the one or more conditions comprise a Non-Zero Power, NZP, CSI Reference Signal, CSI-RS, resource used for channel measurement for the CSI report having an upper limit $C_0$ CSI-RS ports, where $C_0$ is greater than 4.

7. The method of claim 6, wherein the upper limit $C_0$ is higher layer configured to the UE by the network.

8. The method of claim 6, wherein the upper limit $C_0$ is a UE capability reported by the UE to the network.

9. The method of claim 1, wherein the one or more conditions comprise the CSI report being based on more than one Non-Zero Power, NZP, CSI Reference Signal, CSI-RS, resource.

10. The method of claim 9, wherein CSI parameters in the CSI report are based on joint channel measurements performed on the more than one NZP CSI-RS resource.

11. The method of claim 10, wherein the more than one NZP CSI-RS resource used for channel measurement are reported via more than one CSI-RS Resource Indicators, CRIs, as part of the CSI report.

12. The method of claim 1, wherein the one or more conditions comprise the CSI report being triggered to be carried on a channel having other signals or data.

13. The method of claim 12, wherein the one or more conditions further comprise the CSI report being an Aperiodic CSI, A-CSI, report triggered to be carried on a Physical Uplink Shared Channel, PUSCH, with payload data.

14. The method of claim 13, wherein the lower CSI computation delay requirement is applied when computing the CSI for the A-CSI report.

15. The method of claim 1, wherein:
   a first set of conditions is used by the UE for determining if a first CSI computation delay requirement should be applied instead of a second CSI computation delay requirement when the UE is configured with the one or more higher layer configured parameters; and
   a second set of conditions is used by the UE for determining if the first CSI computation delay requirement should be applied over the second CSI computation delay requirement when the UE is not configured with the one or more higher layer configured parameters.

16. The method of claims 1, wherein a number $N'_{CPU}$ of CSI Processing Units, CPUs, is dedicated for one or more CSI computations based on the lower CSI computation delay requirement, where N'CPU is different from a number $N_{CPU}$ of CPUs to be used for one or more CSI computations based on the higher CSI computation delay requirement.

17. A User Equipment, UE, for reporting Channel State Information, CSI, to a network, the UE comprising processing circuitry configured to cause the UE to:
   determine one or more conditions to apply a lower CSI computation delay requirement instead of a higher CSI computation delay requirement when computing CSI for a CSI report, wherein the one or more conditions are determined according to one or more higher layer configured parameters; and provide the CSI report to the network using the lower CSI computation delay requirement when at least one of the one or more conditions is met, wherein the lower CSI computation delay requirement is an ultra-low latency CSI computation delay.

\* \* \* \* \*